(12) United States Patent
Miyatake

(10) Patent No.: US 9,200,428 B2
(45) Date of Patent: Dec. 1, 2015

(54) SHOVEL

(75) Inventor: Tsutomu Miyatake, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 345 days.

(21) Appl. No.: 13/514,068

(22) PCT Filed: Dec. 3, 2010

(86) PCT No.: PCT/JP2010/007065
§ 371 (c)(1),
(2), (4) Date: Jun. 6, 2012

(87) PCT Pub. No.: WO2011/070758
PCT Pub. Date: Jun. 16, 2011

(65) Prior Publication Data
US 2012/0234613 A1 Sep. 20, 2012

(30) Foreign Application Priority Data

Dec. 7, 2009 (JP) .................................. 2009-277926

(51) Int. Cl.
*B60L 11/18* (2006.01)
*E02F 9/08* (2006.01)
(Continued)

(52) U.S. Cl.
CPC ........... *E02F 9/0858* (2013.01); *B60L 11/1877* (2013.01); *E02F 9/2075* (2013.01);
(Continued)

(58) Field of Classification Search
CPC ............. H01M 10/0481; H01M 10/5004; H01M 10/5055; H01M 10/6554; B60L 11/1877
USPC ........... 429/120, 99, 163, 159, 156, 100, 153; 180/65.1, 68.5
See application file for complete search history.

(56) References Cited

U.S. PATENT DOCUMENTS 5,006,924 A * 4/1991 Frankeny et al. .............. 257/714
5,470,679 A * 11/1995 Lund et al. ..................... 429/210
(Continued)

FOREIGN PATENT DOCUMENTS

CN 101315973 B 9/2012
JP 08-0111244 * 4/1996
(Continued)

OTHER PUBLICATIONS

International Search Report and Written Opinion corresponding to International Patent Application No. PCT/JP2010/007065 dated Mar. 1, 2011.
(Continued)

*Primary Examiner* — Katy M Ebner
*Assistant Examiner* — Emma K Frick
(74) *Attorney, Agent, or Firm* — Squire Patton Boggs (US) LLP

(57) ABSTRACT

An upper rotation body is rotatably attached on a lower travelling body. A storage battery module is loaded onto the upper rotation body. The storage battery module has a plurality of plate-shaped storage battery cells that are stacked in z direction when an xyz rectangular coordinate system is defined. At least one heat transfer plate is arranged between the storage battery cells. Pressing plates, which are arranged at both ends of the stack structure of the storage battery cells, apply a compressive force in the stacking direction to the storage battery cells. A first wall plate and a second wall plate pinch the stacked body in the y-direction and are fixed to the pressing plates. The positions of the heat transfer plates are restricted with respect to the first wall plate and the second wall plate.

11 Claims, 18 Drawing Sheets

(51) Int. Cl.
*E02F 9/20* (2006.01)
*H01G 2/04* (2006.01)
*H01G 9/08* (2006.01)
*H01G 9/00* (2006.01)
*H01M 10/02* (2006.01)
*H01M 10/04* (2006.01)
*H01M 10/6555* (2014.01)
*H01M 10/613* (2014.01)

(52) U.S. Cl.
CPC ............ *E02F9/2091* (2013.01); *H01G 2/04* (2013.01); *H01G 9/08* (2013.01); *H01G 9/155* (2013.01); *H01M 10/02* (2013.01); *H01M 10/0481* (2013.01); *H01M 10/613* (2015.04); *H01M 10/6555* (2015.04); *Y02E 60/13* (2013.01); *Y02T 10/7022* (2013.01)

(56) References Cited

U.S. PATENT DOCUMENTS

| | | | |
|---|---|---|---|
| 7,605,562 B2 * | 10/2009 | Kim | 320/107 |
| 7,914,924 B2 * | 3/2011 | Sugeno et al. | 429/159 |
| 8,309,247 B2 | 11/2012 | Shinyashiki et al. | |
| 8,642,203 B2 * | 2/2014 | Joswig et al. | 429/120 |
| 2006/0273758 A1 | 12/2006 | Sanada et al. | |
| 2007/0190409 A1 | 8/2007 | Sakurai | |
| 2007/0207349 A1 | 9/2007 | Kemper et al. | |
| 2008/0299453 A1 | 12/2008 | Shinyashiki et al. | |
| 2008/0318119 A1 * | 12/2008 | Watanabe et al. | 429/99 |
| 2009/0183932 A1 * | 7/2009 | Suematsu | 180/65.1 |
| 2011/0023290 A1 | 2/2011 | Shinyashiki et al. | |
| 2011/0052960 A1 * | 3/2011 | Kwon et al. | 429/120 |
| 2012/0040226 A1 * | 2/2012 | Kim et al. | 429/120 |
| 2012/0129041 A1 * | 5/2012 | Komazawa | 429/158 |
| 2013/0101881 A1 * | 4/2013 | Syed et al. | 429/120 |
| 2013/0108902 A1 * | 5/2013 | Kristofek et al. | 429/72 |
| 2013/0302127 A1 * | 11/2013 | Kuji | 414/744.2 |

FOREIGN PATENT DOCUMENTS

| | | | |
|---|---|---|---|
| JP | 08-111244 A | | 4/1996 |
| JP | 2000-348781 A | | 12/2000 |
| JP | 2001-011889 | * | 1/2001 |
| JP | 2001-011889 A | | 1/2001 |
| JP | 2003-133188 A | | 5/2003 |
| JP | 2006-040696 A | | 2/2006 |
| JP | 2006-127938 A | | 5/2006 |
| JP | 2006-339032 A | | 12/2006 |
| JP | 2008-124033 A | | 5/2008 |
| JP | 2008-187047 A | | 8/2008 |
| JP | 2008-204816 A | | 9/2008 |
| JP | 2008-300288 A | | 12/2008 |
| JP | 2009-170258 | * | 7/2009 |
| JP | 2009-252553 A | | 10/2009 |

OTHER PUBLICATIONS

Japanese Office Action Notice of Reasons of Rejection application No. 2012-216621 dated Jan. 14, 2014.

Office Action mailed Oct. 28, 2014, issued in corresponding JP Patent Application No. 2012-216621 (with English translation attached).

* cited by examiner

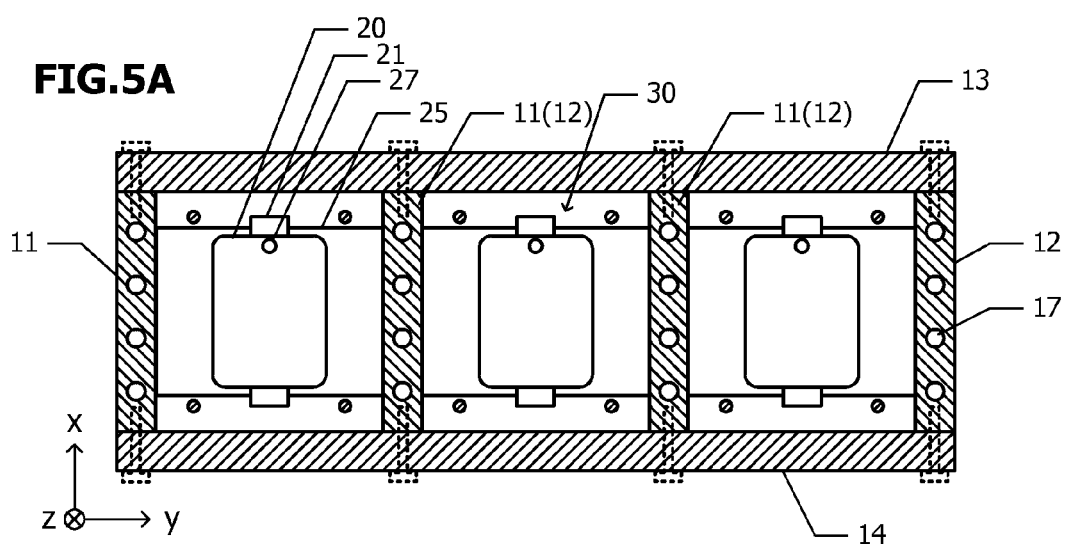
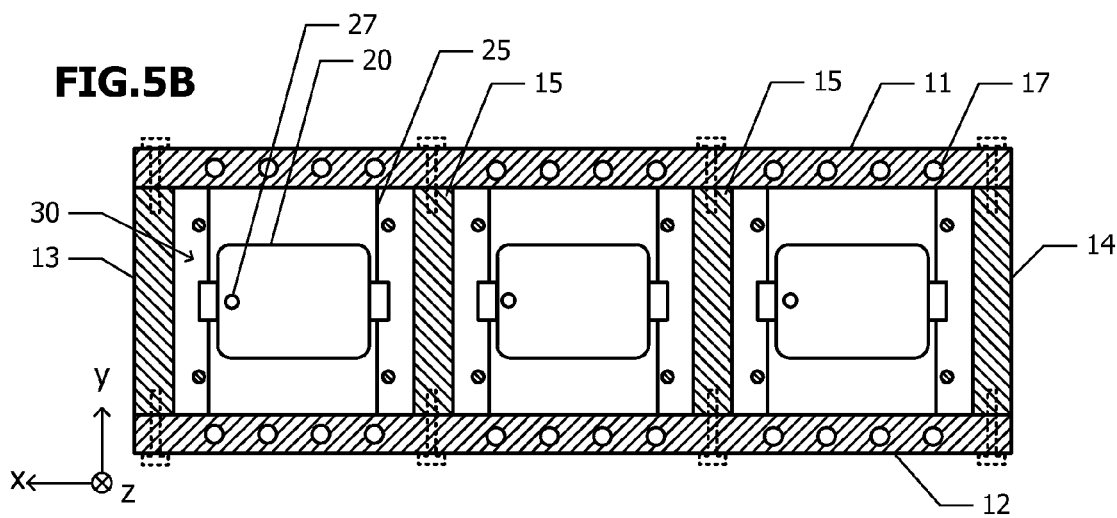
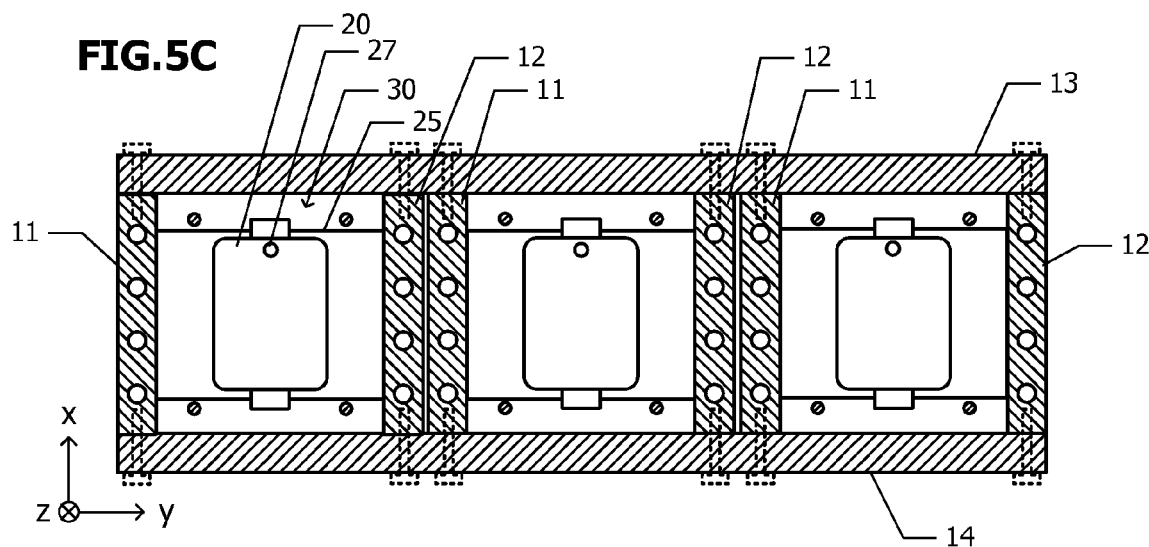

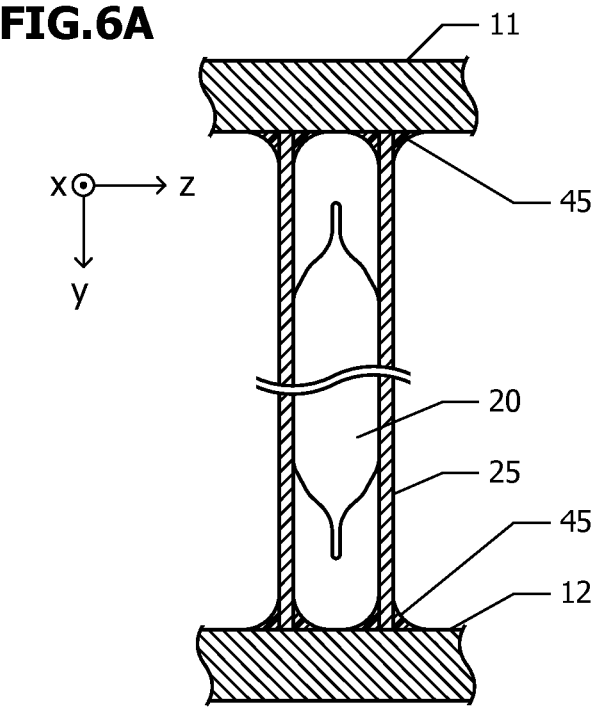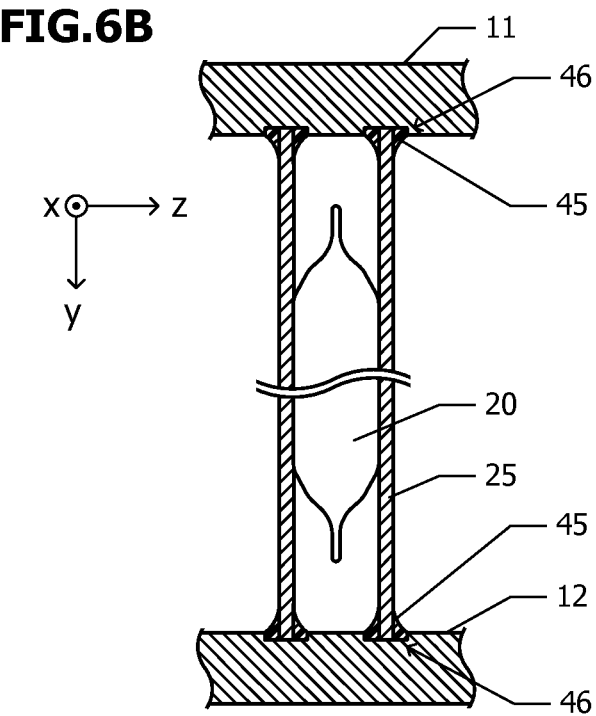

SHOVEL

TECHNICAL FIELD

The present invention relates to a shovel using a storage battery module for an operating machine having a plurality of cells stacked therein.

BACKGROUND ART

Automobiles or operating machines using storage battery cells, such as a chargeable secondary battery or a capacitor, have been developed (PTL 4). A flat (plate-shaped) storage battery cell (battery pack) in which a storage battery element is wrapped with films is proposed as storage battery cells adopted for the automobiles or operating machines. A positive electrode terminal and a negative electrode terminal are led out from an outer peripheral portion of the storage battery cell.

A storage battery module in which a plurality of storage battery cells are connected electrically is obtained by stacking the plurality of storage battery cells and passing tie rods through through-holes provided in the positive electrode terminal and the negative electrode terminal (PTL 1). Various configurations that radiate the heat generated in stacked storage battery cells to the outside are proposed (PTLs 2 and 3).

PRIOR ART DOCUMENTS

Patent Literature

[PTL 1]: US Patent Laid-Open Publication No. 200710207349A1
[PTL 2]: JP-A-8-111244
[PTL 3]: JP-A-2003-133188
[PTL 4]: JP-A-2001-11889

SUMMARY OF INVENTION

Technical Problem

Compared with automobiles, the operating machines often travel on gravel roads with bad road surfaces, and often collide with surrounding deposits, surrounding structures, or the like during operation. For this reason, storage battery modules to be loaded onto the operating machines require high rigidity that can withstand vibration or shock. Moreover, since vibration or shock during excavation is also great in the case of operating machines that perform excavation, the storage battery modules require particularly high rigidity. It is difficult to obtain sufficient rigidity in related-art storage battery modules. Additionally, it is difficult to achieve sufficient cooling efficiency.

Particularly, in shovels having a lower traveling body, an upper rotation body mounted thereon, a boom, and the like, the upper rotation body shakes up and down violently due to shock during work or traveling because of the rattling of a rotary bearing that attaches the upper rotation body. Storage battery modules with sufficient reliability even if attached to the upper rotation body are desired.

Solution to Problem

According to one aspect of the invention, there is provided a shovel including:
a lower traveling body;
an upper rotation body rotatably attached to the lower traveling body; and
a storage battery module loaded onto the upper rotation body, wherein the storage battery module includes:
a stack having
a plurality of plate-shaped storage battery cells that are stacked in the z-direction when an xyz rectangular coordinate system is defined,
at least one heat transfer plate arranged between the storage battery cells, and
pressing plates, which are arranged at both ends of a stack structure of the storage battery cells, applying a compressive force in a stacking direction to the storage battery cells; and
a first wall plate and a second wall plate that pinch the stack in the y-direction and are fixed to the pressing plates. The positions of the heat transfer plates are restricted with respect to the first wall plate and the second wall plate.

According to another aspect of the invention, there is provided a shovel including:
a lower traveling body;
an upper rotation body rotatably attached to the lower traveling body; and
a storage battery module loaded onto the upper rotation body, wherein the storage battery module includes:
a plurality of stacks being arranged in the y-direction, each having
a plurality of plate-shaped storage battery cells that are stacked in the z-direction when an xyz rectangular coordinate system is defined,
pressing plates arranged at both ends of a stack structure of the storage battery cells,
first tie rods that couple the pair of pressing plates together and apply a compressive force in a stacking direction to the stack structure of the storage battery cells, and
at least one heat transfer plate pinched between the storage battery cells; and
a first wall plate and a second wall plate that are attached to each of the stacks, pinch each of the stacks in the y-direction, are fixed to the pressing plates, and are thermally combined with the heat transfer plates; and
a third wall plate and a fourth wall plate that pinch the plurality of stacks in the x-direction, and are fixed to the pressing plates of the plurality of stacks, and the first wall plate and the second wall plate attached to the plurality of stacks.

Advantageous Effects of Invention

The pair of pressing plates, the first wall plate, and the second wall plate constitute a high-rigidity structure. For this reason, the rigidity of the storage battery module can be enhanced. Sufficient reliability can be secured even if this storage battery module is loaded on the upper rotation body that is apt to cause vibration, shock, or the like. Additionally, the storage battery cells can be cooled efficiently through the heat transfer plate, the first wall plate, and the second wall plate.

BRIEF DESCRIPTION OF THE DRAWINGS

FIG. 5A is a cross-sectional view of a storage battery module according to Embodiment 4, FIG. 5B is a cross-sectional view of a storage battery module according to Embodiment 5, and FIG. 5C is a cross-sectional view of a storage battery module according to Embodiment 6.

FIGS. 6A and 6B are partial cross-sectional views of a storage battery module according to Embodiment 7.

DESCRIPTION OF EMBODIMENTS

Figure 1A:
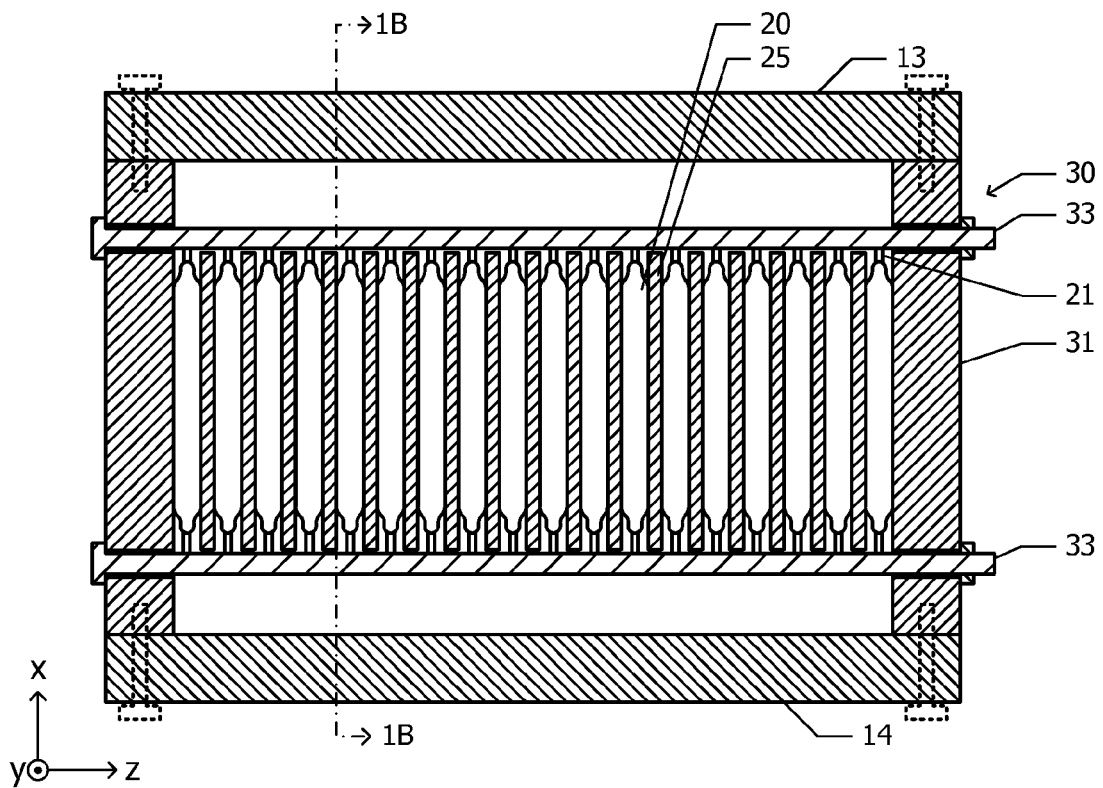
FIGS. 1A and 1B are cross-sectional views of a storage battery module according to Embodiment 1.

Embodiments of the invention will be described, referring to the drawings.

Embodiment 1

FIG. 1A illustrates a cross-sectional view of a storage battery module according to Embodiment 1. In order to make the Embodiment easily understood, an xyz rectangular coordinate system is defined.

A plurality of plate-shaped storage battery cells 20 and heat transfer plates 25 are stacked alternately in the thickness direction (the z-direction). The storage battery cells 20 are arranged at both ends. Pressing plates 31 are brought into close contact with the outermost storage battery cells 20, respectively. A plurality of tie rods 33 penetrate from one pressing plate 31 to the other pressing plate 31, and apply a compressive force in the stacking direction (z-direction) to the storage battery cells 20 and the heat transfer plates 25.

Each of the storage battery cells 20 pinches and seals a flat-plate-shaped storage battery element, such as a secondary battery or an electric double layer capacitor, with a pair of laminate films. The storage battery cell 20 includes a region (welded portion) at an outer peripheral portion thereof in which the laminate films are welded together. Additionally, the storage battery cell 20 includes a pair of electrode terminals 21. The electrode terminals 21 are lead out to the outside from mutually opposed outer peripheral portions of the storage battery cell 20. One of the electrode terminals 21 is a positive electrode, and the other is a negative electrode. By connecting the electrode terminals 21 of the storage battery cells 20 that are adjacent to each other, the plurality of storage battery cells 20 are connected in series.

Aluminum, for example, is used for the heat transfer plates 25, and stainless steel, for example, is used for the tie rods 33 and the pressing plates 31. A structure including the storage battery cells 20, the heat transfer plates 25, the pressing plates 31, and the tie rods 33 is referred to as a stacked body 30. A pair of wall plates 13 and 14 are arranged on both sides of the stacked body 30 in the x-direction, i.e., so as to pinch the stacked body 30 in the x-direction. The wall plates 13 and 14 are fixed to the pressing plates 31 with bolts, respectively.

Figure 1B:
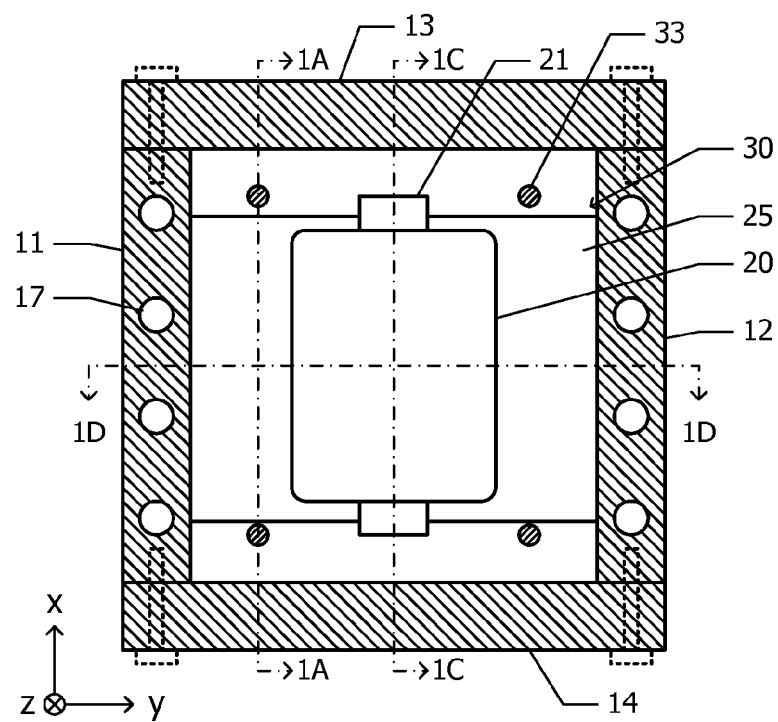

A cross-sectional view along a one-dot chain line 1B-1B of FIG. 1A is shown in FIG. 1B. A cross-sectional view along a one-dot chain line 1A-1A of FIG. 1B corresponds to FIG. 1A. The planar shape of the storage battery cells 20 and the heat transfer plates 25 are substantially rectangular. The electrode terminals 21 are led out from mutually opposed sides (an upper side and a lower side in FIG. 1B). The heat transfer plate 25 extends to the outside of the edge of the storage battery cell 20 in plan view.

A pair of wall plates 11 and 12 are arranged on both sides of the stacked body 30 in the y-direction, i.e., so as to pinch the stacked body 30 in the y-direction. The wall plates 11 and 12 come into contact with the end faces of the heat transfer plates 25. Thereby, the heat transfer plates 25 are thermally coupled with the wall plates 11 and 12. The wall plates 11 and 12 are respectively fixed to the wall plates 13 and 14 with bolts. Channels 17 for allowing a refrigerant to flow therethrough are formed inside the wall plates 11 and 12.

Figure 1C:
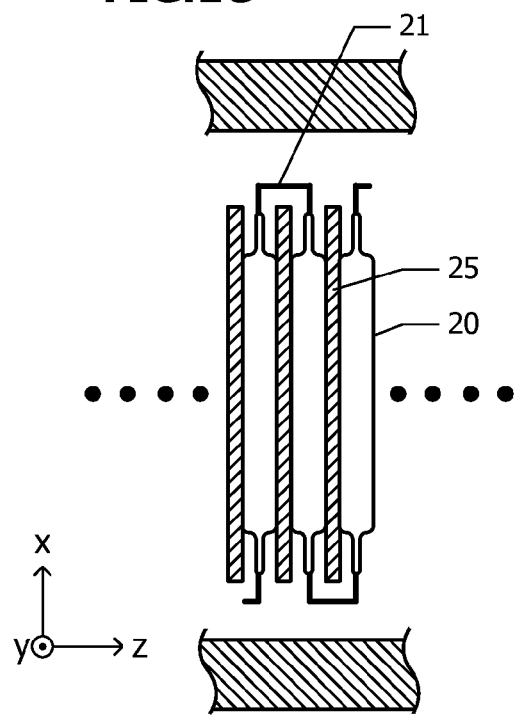
FIGS. 1C and 1D are cross-sectional views of the storage battery module according to Embodiment 1.

A cross-sectional view along a one-dot chain line 1C-1C of FIG. 1B is shown in FIG. 1C. The electrode terminals 21 led out from the storage battery cells 20 that are adjacent to each other pass the outside of the edges of the heat transfer plates 25, and are connected to the electrode terminals 21 of the next storage battery cells 20.

Figure 1D:
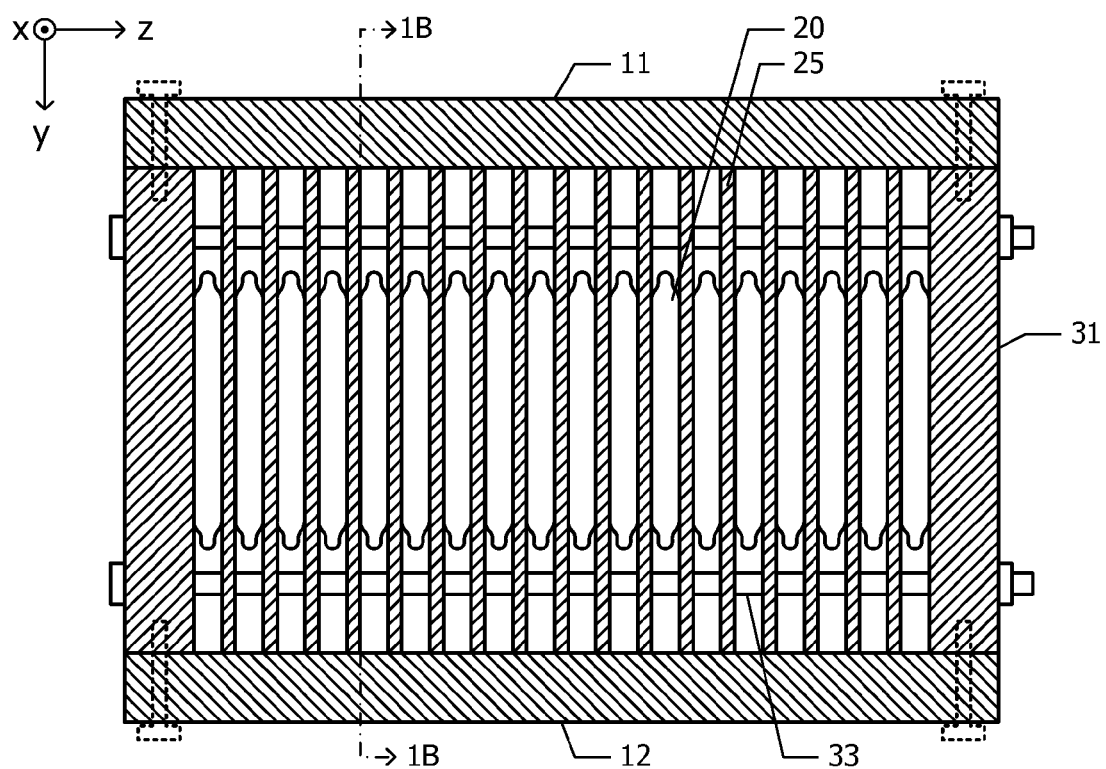

A cross-sectional view along a one-dot chain line 1D-1D of FIG. 1B is shown in FIG. 1D. The heat transfer plates 25 come into contact with the wall plates 11 and 12 at the end faces thereof. The wall plates 11 and 12 are respectively fixed to the pressing plates 31 with bolts.

There are individual differences in the thicknesses of the storage battery cells 20 shown in FIGS. 1A and 1D. For this reason, the distance between the pair of pressing plates 31 varies from product to product. This variation can be absorbed by employing a structure in which the wall plates 11 to 14 come into contact with the end faces of the pressing plates 31 is provided, and holes for bolts formed in the wall plates 11 to 14 are formed as long holes that are long in the z-direction.

Figure 2A:
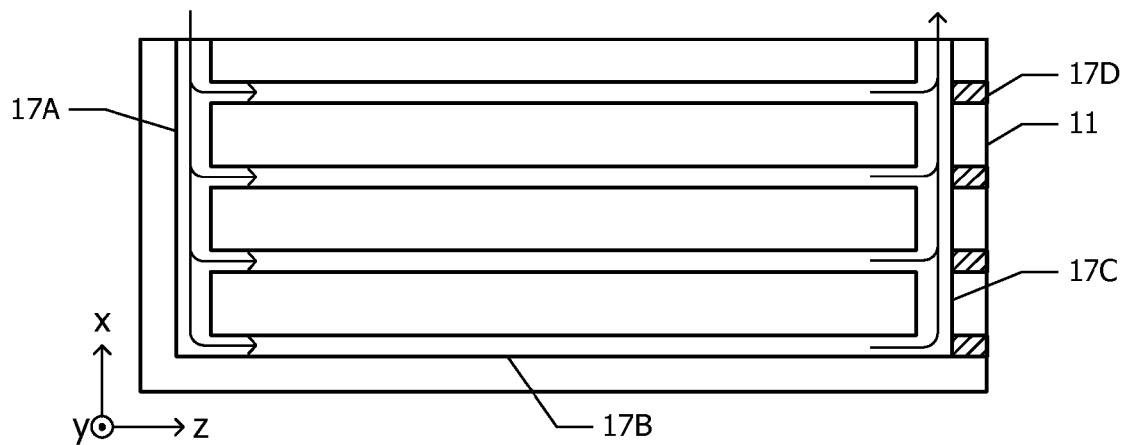
FIGS. 2A and 2B are schematic views showing a refrigerant channel of the storage battery module according to Embodiment 1.

FIG. 2A illustrates the shape of the refrigerant channel 17 formed in the wall plate 11. The refrigerant channel 17 includes an introduction passage 17A, a plurality of main paths 17B, and a discharge passage 17C. Each of the introduction passage 17A and the discharge passage 17C extends to the inside of the wall plate 11 along the x-direction from one end face parallel to the z-direction. Each of the main paths 17B extends in the z-direction from the introduction passage 17A, and reaches the discharge passage 17C. The introduction passage 17A, the main paths 17B, and the discharge passage 17C are arranged, for example, inside the wall plate 11, and are constituted as elongated holes that extend in a direction parallel to the surface. The introduction passage 17A and the discharge passage 17C are formed by performing drilling with a drill from an end face parallel to the yz plane. The main paths 17B are formed by embedding opening portions with embedded plugs 17D after drilling is performed with a drill from an end face parallel to the xy plane. Piping through which a refrigerant passes may be brought into close contact with the wall plate 11.

Figure 2B:
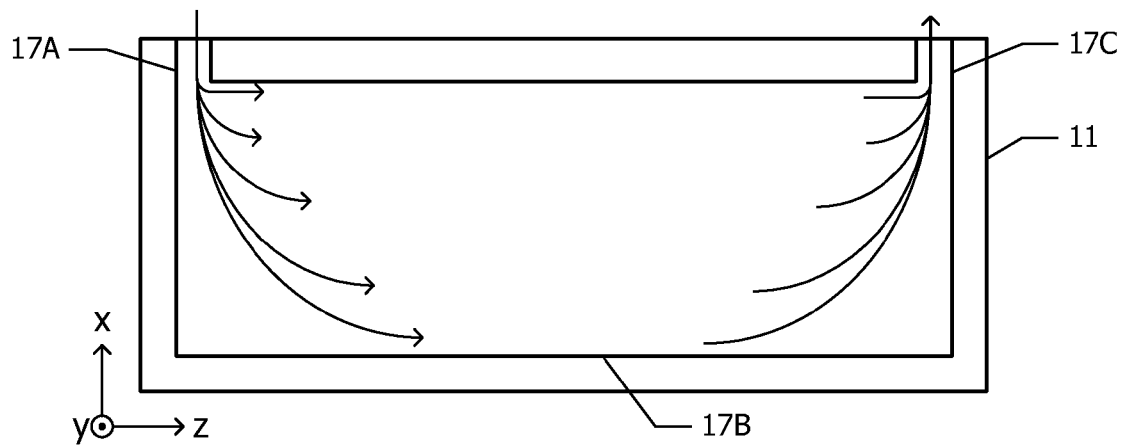

Another example of the refrigerant channel 17 is shown in FIG. 2B. In the example shown in FIG. 2A, a plurality of main paths 17B extending from the introduction passage 17A to the discharge passage 17C are arranged. In the example shown in FIG. 2B, the main path 17B is constituted by one wide planar channel. The wall plate 11 is formed by forming a recess corresponding to the refrigerant channel 17 in a metal plate, closing the recess with another metal plate, and welding the outer peripheries of the two metal plates.

In the storage battery module shown in Embodiment 1, the stack structure of the storage battery cells 20 and the heat transfer plates 25 is maintained by the tie rods 33 and the pressing plates 31. The pressing plates 31 and the wall plates 11 to 14 form a parallelepiped structure having a rectangular parallelepiped shape, and adjacent wall plates of the parallelepiped structure are fixed together with bolts. For this reason, high rigidity can be secured, and the positions of the heat transfer plates 25 can be restricted with respect to the wall plates 11 and 12. The heat generated from the storage battery cells 20 is transmitted to the wall plates 11 and 12 via the heat transfer plates 25. For this reason, the storage battery cells 20 can be cooled efficiently. Since a compressive force is applied to the storage battery cells 20 and the heat transfer plates 25 by the pressing plates 31, the close contact state between the storage battery cells 20 and the heat transfer plates 25 can be enhanced. Thereby, the heat-transfer efficiency between the storage battery cells 20 and the heat transfer plates 25 can be enhanced.

The pressing plates 31 for maintaining the stack structure of the storage battery cells 20 and the heat transfer plates 25 serve as the wall plates of the parallelepiped structure. The wall plates 11 and 12 of parallelepiped structure serve as heat-absorbing plates for cooling the storage battery cells 20. Since a plurality of functions are given to the pressing plates 31 and the wall plates 11 and 12 in this way, the number of parts is reduced.

In Embodiment 1, the storage battery cells 20 and the heat transfer plates 25 are stacked alternately, but the number of the heat transfer plates 25 may be reduced. For example, one heat transfer plate 25 may be arranged with respect to two storage battery cells 20. Alternatively, at least one heat transfer plate 25 may be arranged substantially at the center of the stacked storage battery cells 20.

A shovel travels by means of a metal crawler unlike automobiles that travel with rubber tires. Additionally, an upper rotation body is supported by a lower traveling body via a bearing. The bearing includes metal parts that make relative motion and cannot be said to have no rattling. For this reason, vibration of the lower traveling body during traveling may be amplified and transmitted to the upper rotation body. Accordingly in order to prevent resonance, the storage battery module loaded onto the upper rotation body requires a high natural frequency.

Although the example of the high-rigidity storage battery module based on the parallelepiped structure is shown in Embodiment 1, a structure may be adopted in which the wall plates 13 and 14 are removed under a condition that the rigidity or natural frequency required for an operating machine can be satisfied.

In Embodiment 1, the electric double layer capacitors or the like are used for the storage battery cells 20, but lithium ion capacitors may be used. A compressive force does not need to be applied to the lithium ion capacitors in order to maintain electrical properties. In this case, application of a compressive force has the effect of enhancing the heat-transfer efficiency from the storage battery cells 20 to the heat transfer plates 25. A compressive force required to support the storage battery cells mechanically and a compressive force required to enhance the heat-transfer efficiency are smaller than a compressive force required to maintain the electrical properties of the electric double layer capacitors. Accordingly, in a case where the lithium ion capacitors are used for the storage battery cells 20, the compressive force may be made smaller compared with the case where the electric double layer capacitors are used.

Embodiment 2

Figure 3A:
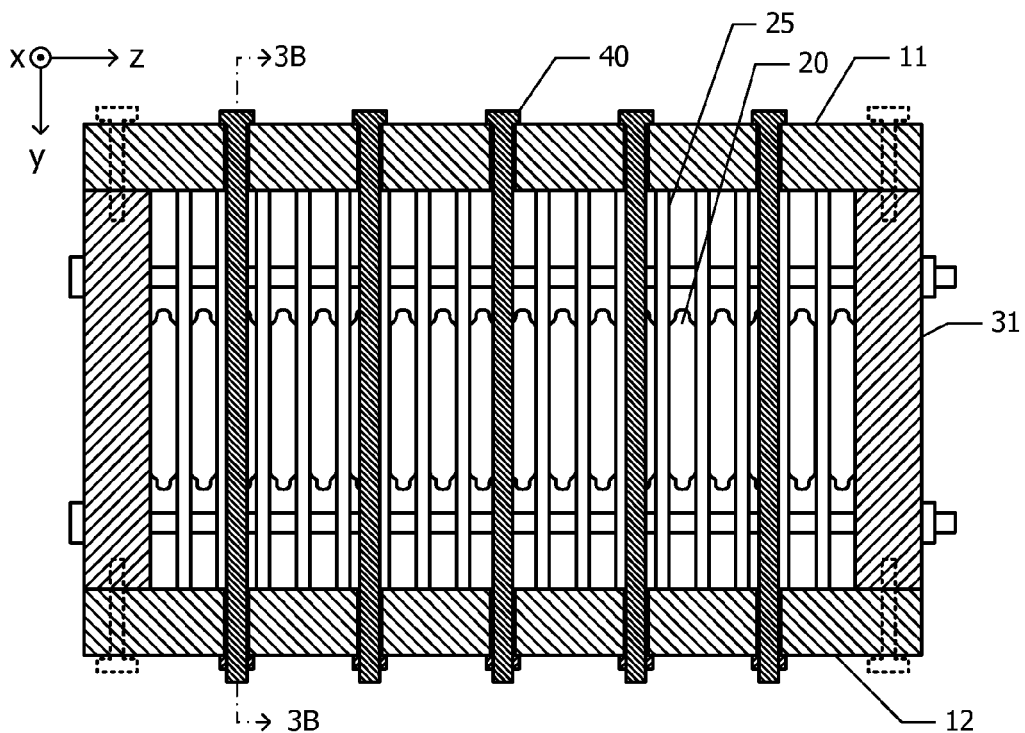
FIGS. 3A and 3B are cross-sectional views of a storage battery module according to Embodiment 2.
Figure 3B:
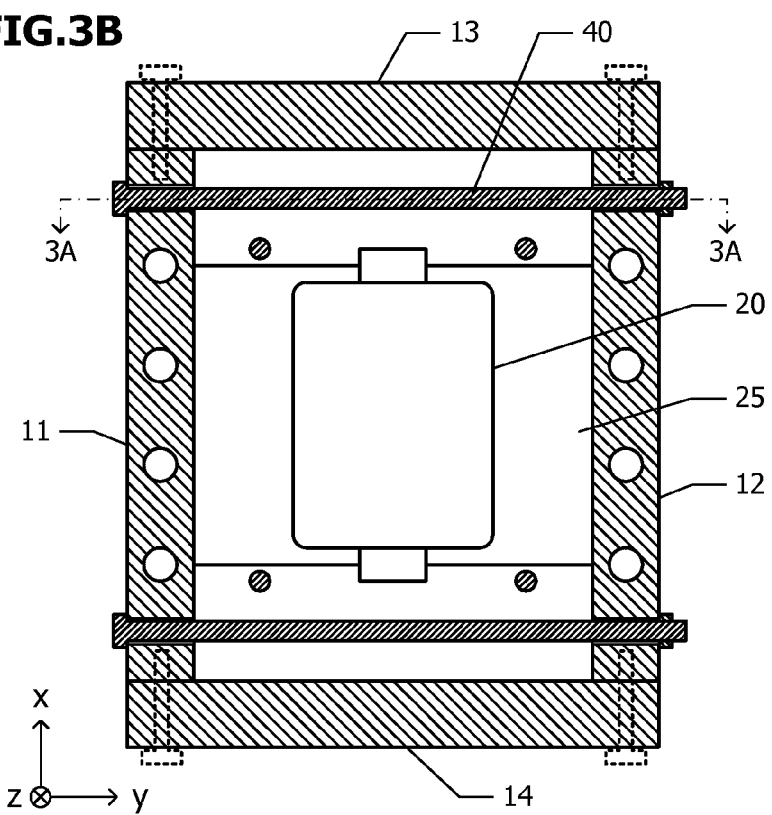

FIGS. 3A and 3B illustrate cross-sectional views of a storage battery module according to Embodiment 2. FIG. 3B is a cross-sectional view along a one-dot chain line 3B-3B of FIG. 3A, and FIG. 3A is a cross-sectional view along a one-dot chain line 3A-3A of FIG. 3B. Differences from the storage battery module according to Embodiment 1 will be described below.

In Embodiment 1, the wall plate 11 and the wall plate 12 are fixed to the wall plates 13 and 14 shown in FIG. 1B and the pressing plates 31 shown in FIG. 1D near the outer peripheral portions of the wall plate 11 and the wall plate 12. At the positions where the wall plates 11 and 12 come into contact with the heat transfer plates 25, the wall plates 11 and 12 are pressed against the heat transfer 10 plates 25 by the rigidity of the wall plates 11 and 12.

In Embodiment 2, a plurality of tie rods 40 penetrate from the wall plate 11 to the wall plate 12. The tie rods 40 are disposed so as not to spatially interfere with arrangement of the storage battery cells 20 and the heat transfer plates 25. A force in a direction in which the distance between the wall plate 11 and the wall plate 12 is narrowed is applied to both the wall plates 11 and 12 by the tie rods 40. Holes through which the tie rods 40 passes are arranged inside an area surrounded by the positions where the wall plates 11 and 12 are fixed to the pressing plates 31 and the wall plates 13 and 14. For this reason, the wall plates 11 and 12 can be pressed against the heat transfer plates 25 by a greater force. Thereby, the heat transfer rate from the heat transfer plates 25 to the wall plates 11 and 12 can be enhanced.

Although FIGS. 3A and 3B show the example in which the plurality of tie rods 40 are attached, one tie rod 40 may be attached.

Although the example of the high-rigidity storage battery module based on the parallelepiped structure is shown in Embodiment 2, similarly to Embodiment 1, a structure may be adopted in which the wall plates 13 and 14 are removed under a condition that the rigidity or natural frequency required for an operating machine can be satisfied.

Embodiment 3

Figure 4:
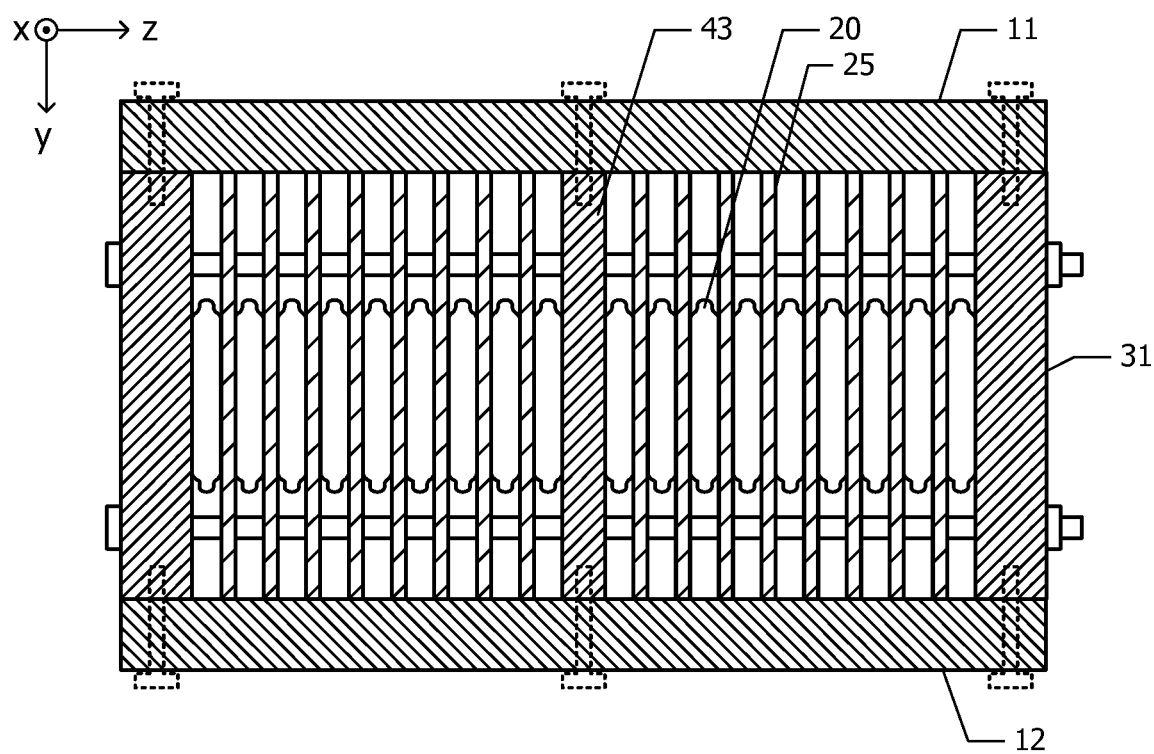
FIG. 4 is a cross-sectional view of a storage battery module according to Embodiment 3.

FIG. 4 shows a cross-sectional view of a storage battery module according to Embodiment 3. Differences from the storage battery module according to Embodiment 1 will be described below.

In Embodiment 3, instead of the heat transfer plates, an intermediate plate 43 is inserted between two storage battery cells 20 substantially at the center of the stack structure of the storage battery cells 20. Iron or stainless steel is used for the intermediate plate 43, and the intermediate plate 43 has rigidity higher than the heat transfer plates 25.

The intermediate plate 43 is brought into contact with the wall plates 11 and 12 at the end faces of the intermediate plate 43, and is fixed to the wall plates 11 and 12 with bolts. Tie rods 33 pass through through-holes formed in the intermediate plate 43. When a shock is applied to the storage battery module, the intermediate plate 43 inhibits displacement of the tie rods 33 in the x-direction and the y-direction.

The tie rods 33 can be considered as beam structures that are supported by the pressing plates 31 at both ends of the tie rods 33. Supporting the tie rods 33 with the intermediate plate 43 substantially at the centers of the tie rods is equivalent to the length of the beams being approximately halved. For this reason, the natural frequency of the vibration of the storage battery module in the x-direction and the y-direction can be made high. Additionally the intermediate plate 43 inhibits displacement of the storage battery cells 20 coming into contact therewith in the z-direction. For this reason, the natural frequency of the vibration of the storage battery module in the z-direction can be made high. Thereby, the shock resistance of the storage battery module is enhanced.

Embodiment 4

FIG. 5A shows a cross-sectional view of a storage battery module according to Embodiment 4. In the storage battery module according to Embodiment 4, three storage battery modules having the same structure as the storage battery module according to Embodiment 1 shown in FIG. 1B are arranged in the y-direction. A wall plate between mutually adjacent stacked bodies 30 is shared by both the storage battery modules. That is, the wall plate 12 of one storage battery module serves as the wall plate 11 of the next storage battery module. The heat transfer plates 25 of each stacked body 30 come into contact with two wall plates 11 and 12 that pinch the stacked body 30 the y-direction. Each of the wall plates 13 and 14 that pinch three stacked bodies 30 in the x-direction is constituted by one continuous plate member.

The storage battery cell 20 may be provided with a bleed valve 27 for discharging gas generated inside the storage battery cell 20. Since the bleed valve 27 is generally larger compared to the thickness of the storage battery cell 20, it is difficult to attach the bleed valve 27 to an end face substantially perpendicular to the z axis of the storage battery cell 20. Since a lead wire for electrode extraction or the like is arranged in the vicinity of the edge from which an electrode terminal 21 of the storage battery cell 20 is led out, the vicinity of the edge inclines with respect to the xy plane. The bleed valve 27 is attached to this inclined portion in many cases.

During assembly, the heat transfer plates 25 of each stacked body 30 are brought into contact with wall plates on both sides by applying a compressive force in the y-direction to the three storage battery modules arranged in the y-direction. In this state, the wall plates 13 and 14 are fixed to the wall plates 11 and 12, and the pressing plates 31 (FIG. 1D) of the stacked body 30 with bolts.

Since wall plates between mutually adjacent stacked bodies 30A to 30C is shared by both, the number of parts can be reduced. Although the three stacked bodies 30 were incorporated in FIG. 5A, two stacked bodies 30 may also be incorporated and four or more stacked bodies 30 may also be incorporated.

Since the gas generated within the storage battery cell 20 is accumulated at the upper region of the space within the storage battery cell 20, it is preferable to maintain a posture in which the bleed valve 27 is arranged in a vertical upwards direction. The storage battery module according to Embodiment 4 is preferably mounted to an operating machine in a posture (posture in which the yz plane becomes horizontal) in which the x-direction becomes parallel to the vertical direction. The storage battery module according to Embodiment 4 is suitable for mounting to an instrument or an operating machine having a mounting space that spreads in the horizontal direction.

Embodiment 5

FIG. 5B shows a cross-sectional view of a storage battery module according to Embodiment 5. The storage battery module according to Embodiment 5 includes three stacked bodies 30 having the same structure as the storage battery module according to Embodiment 1.

The three stacked bodies 30 are arranged in the x-direction in a posture in which the respective stacking directions become parallel to the z-direction. The wall plates 11 and 12 pinch the three stacked bodies 30 in the y-direction. The wall plates 13 and 14 pinch the three stacked bodies 30 in the x-direction. A partition wall 15 is arranged between mutually adjacent stacked bodies 30. The wall plates 13 and 14 and the partition walls 15 are fixed to the wall plates 11 and 12 with bolts. Additionally, the pressing plates 31 (FIG. 1D) of the stacked body 30 are fixed to the wall plates 11 and 12 with bolts, similarly to the case of Embodiment 1. Moreover, the pressing plates 31 and the partition walls 15 are also fixed to each other with bolts. The respective heat transfer plates 25 of the stacked body 30 come into contact with wall plates 11 and 12. The refrigerant channels 17 are formed in the wall plate 11 and 12.

The pressing plates 31 and the wall plates 11 to 14 constitute a parallelepiped structure. For this reason, high rigidity can be secured. Additionally, the partition walls 15 have a function in further enhancing rigidity.

In Embodiment 5, since the heat transfer plates 25 come into contact with the wall plates 11 and 12, it is not necessary to apply a compressive force in the x-direction when the wall plates 11 and 12 are fixed. For this reason, assembly and maintenance are easy in the storage battery module according to Embodiment 5, compared to the storage battery module according to Embodiment 4.

When arrangement of the bleed valve 27 is taken into consideration, the storage battery module according to Embodiment 5, similarly to the case of Embodiment 4, is also preferably mounted to an operating machine in a posture (posture in which the yz plane becomes horizontal) in which the x-direction becomes parallel to the vertical direction. The storage battery module according to Embodiment 5 is suitable for mounting to an instrument or an operating machine having a flat mounting space in which the thickness direction faces the horizontal direction.

Embodiment 6

FIG. 5C shows a cross-sectional view of a storage battery module according to Embodiment 6. In the storage battery module according to Embodiment 6, three storage battery modules having the same structure as the storage battery module according to Embodiment 1 shown in FIG. 1B are arranged in the y-direction. Mutually adjacent storage battery modules do not share the wall plates 11 and 12, and wall plates are provided individually. For this reason, two partition walls 11 and 12 are arranged between mutually adjacent stacked bodies 30.

In Embodiment 6, the wall plates 13 and 14 may be fixed to the wall plates 11 and 12 after the wall plates 11 and 12 are fixed to each of the stacked bodies 30. For this reason, it is not necessary to apply a compressive force in the y-direction to the storage battery modules when the wall plates 13 and 14 are fixed. Although the storage battery module according to Embodiment 6 has an increased number of parts compared to the storage battery module of Embodiment 4 shown in FIG. 5A, assembly and maintenance thereof are easy.

When arrangement of the bleed valve 27 is taken into consideration, the storage battery module according to Embodiment 6, similarly to the case of Embodiment 4, is also preferably mounted to an operating machine in a posture (posture in which the yz plane becomes horizontal) in which the x-direction becomes parallel to the vertical direction. The storage battery module according to Embodiment 6 is suitable for mounting to an instrument or an operating machine having a mounting space that spreads in the horizontal direction.

Embodiment 7

FIG. 6A shows a partial cross-sectional view of a storage battery module according to Embodiment 7. Differences from the storage battery module according to Embodiment 1 shown in FIGS. 1A to 1D will be described below.

In Embodiment 1, as shown in FIG. 1D, as the heat transfer plates 25 come into contact with the wall plates 11 and 12, both are combined thermally. In Embodiment 7, the heat transfer plates 25 and the wall plates 11 and 12 are bonded together with thermally conductive adhesives 45 in contact locations so that the heat transfer plates 25 are anchored to the wall plates 11 and 12. In a case where minute gaps are formed between the heat transfer plates 25 and wall plates 11 and 12, these gaps are filled in with the adhesives. For this reason, the heat transfer rate between the heat transfer plates 25 and the wall plates 11 and 12 can be enhanced. As such, thermal resistance in the contact locations can be made small by preventing the heat transfer plates 25 from coming into sliding contact with the wall plates 11 and 12 (preventing the heat transfer plates 25 from moving in a state where the heat transfer plates come into contact with the wall plates 11 and 12). Thereby, the cooling efficiency of the heat transfer plates 25 and the storage battery cells 20 can be improved, and a marked rise in the temperature of the storage battery cells 20 can be suppressed.

As shown in FIG. 6B, grooves 46 may be formed in the respective inner surfaces of the wall plates 11 and 12. The edges of the heat transfer plate 25 are inserted into the grooves 46, and the thermally conductive adhesives 46 fill the grooves.

Although the example of the high-rigidity storage battery module based on the parallelepiped structure is shown in Embodiment 7, similarly to Embodiment 1, a structure may be adopted in which the wall plates 13 and 14 (FIGS. 1A and 1B) are removed under the condition that the rigidity or natural frequency required for an operating machine can be satisfied.

Embodiment 8

Figure 7A:
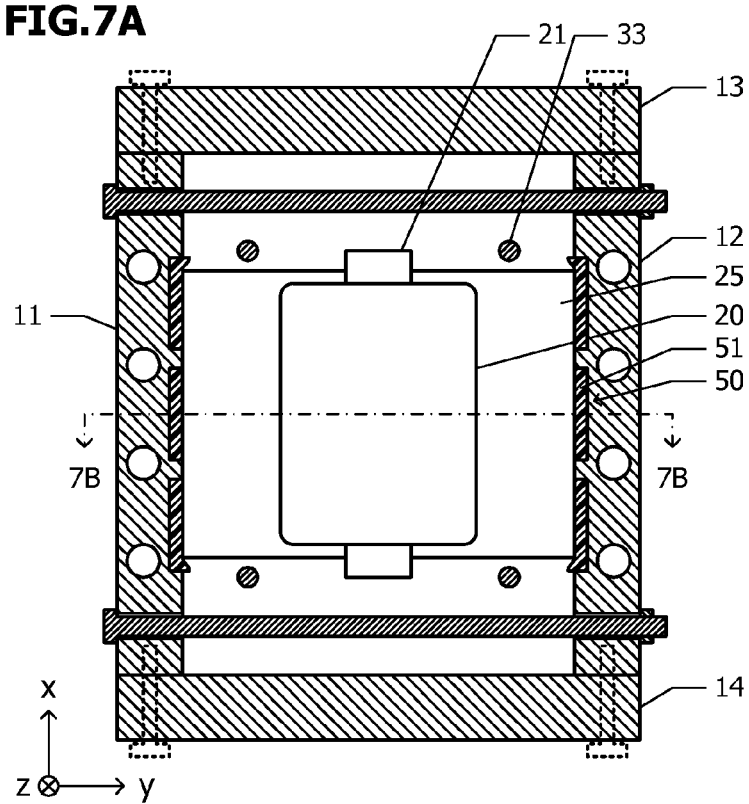
FIGS. 7A and 7B are cross-sectional views of a storage battery module according to Embodiment 8.
Figure 7B:
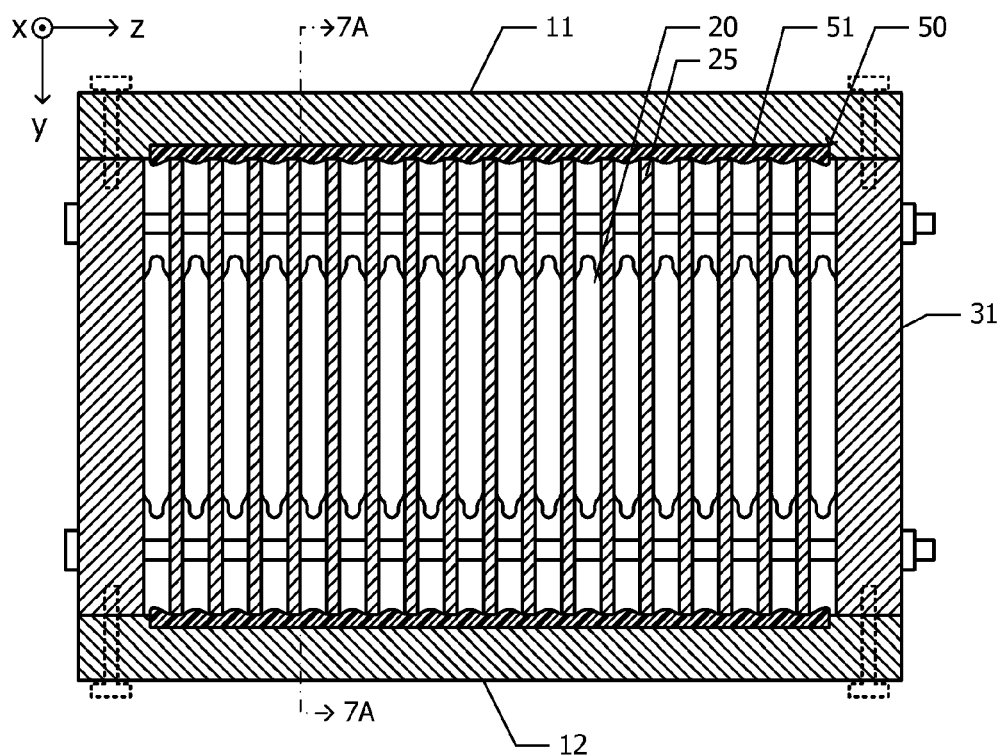

FIGS. 7A and 7B show cross-sectional views of a storage battery module according to Embodiment 8. FIG. 7B is a cross-sectional view along a one-dot chain line 7B-7B of FIG. 7A, and FIG. 7A is a cross-sectional view along a one-dot chain line 7A-7A of FIG. 7B. Differences from the storage battery module according to Embodiment 2 shown in FIGS. 3A and 3B will be described below.

Similarly to Embodiment 1, the pressing plates 31 apply a compressive force in the stacking direction to the storage battery cells 20, and the positions of the heat transfer plates 25 are restricted with respect to the wall plates 11 and 12. The inner surfaces of the wall plates 11 and 12 are formed with three recesses 50 that extend in the z-direction. Each of the recesses 50 has a dimension in the width direction greater than a dimension in the depth direction. The recess 50 is loaded with an elastic member 51 having thermal conductivity. A heat transfer rubber sheet, for example, is used for the elastic member 51. The edge of the heat transfer plate 25 intersects the recesses 50 or overlaps the recesses 50 partially.

A portion of the elastic member 51 protrudes from the opening surface of the recess 50 in a state where an external force is not applied to the elastic member 51. For example, a heat transfer rubber sheet thicker than the depth of the recess 50 is used as the elastic member 51.

As shown in FIG. 7A, the heat transfer plates 25 come into contact with the inner surfaces of the wall plates 11 and 12 in regions where the recesses 50 are not formed. As shown in FIGS. 7A and 7B, the heat transfer plate 25 crushes the elastic members 51 in regions where the edge of the heat transfer plate 25 intersects the recesses 50 and in regions where the edge of the heat transfer plate 25 overlaps the recesses 50.

The heat transfer member 25 and wall plates 11 and 12 are thermally coupled together via the elastic members 51. For this reason, a stable thermal coupling can be secured. By preventing the heat transfer plates 25 from coming into sliding contact with the wall plates 11 and 12 in this way, the thermal resistance in contact locations can be made small. Thereby, the cooling efficiency of the heat transfer plates 25 and the storage battery cells 20 can be improved, and a marked rise in the temperature of the storage battery cells 20 can be suppressed.

The portion of the elastic member 51 that protrudes from the opening plane of the recess 50 becomes a crushing margin. The elastic member 51 is not crushed more than this crushing margin. By adjusting the dimension (thickness) of the elastic member 51 and the depth of the recess 50, the crushing margin can be made to fall within a desired allowable range. For this reason, deterioration over time of the elastic member 51 caused by creep strain can be suppressed.

Although the example of the high-rigidity storage battery module based on the parallelepiped structure is shown in Embodiment 8, similarly to Embodiment 2, a structure may be adopted in which the wall plates 13 and 14 (FIG. 7A) are removed under the condition that the rigidity or natural frequency required for an operating machine can be satisfied.

Embodiment 9

Figure 8A:
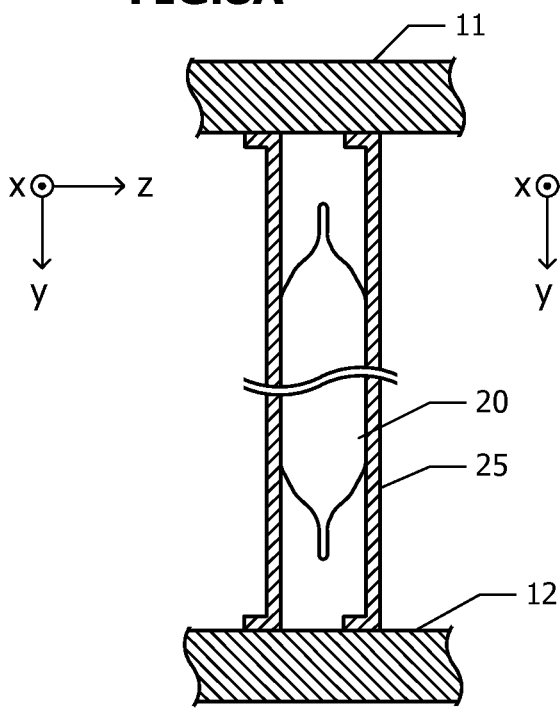
FIGS. 8A to 8C are partial cross-sectional views of a storage battery module according to Embodiment 9.

FIG. 8A shows a partial cross-sectional view of a storage battery module according to Embodiment 9. Differences from the storage battery module according to Embodiment 1 shown in FIGS. 1A to 1D will be described below.

In Embodiment 9, the end portions of the heat transfer plates 25 that come into contact with the wall plates 11 and 12 are bent substantially perpendicularly in a section parallel to the yz plane. For this reason, the contact area between the heat transfer plates 25 and the wall plates 11 and 12 becomes large. Thereby, the heat transfer rate between both can be enhanced.

Figure 8B:
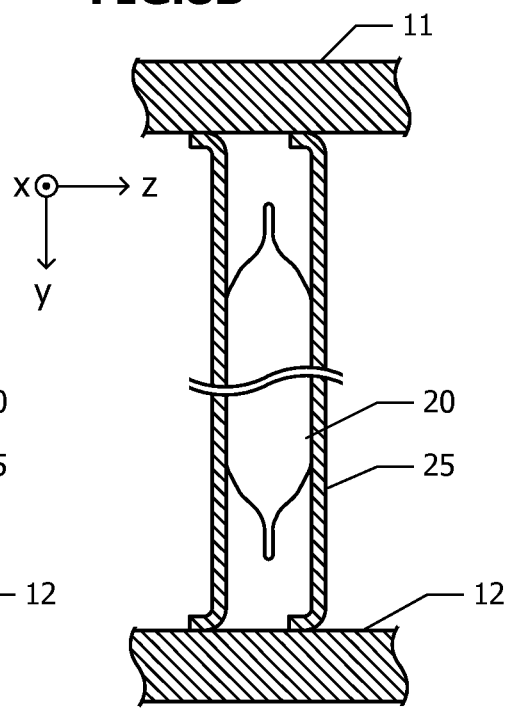
Figure 8C:
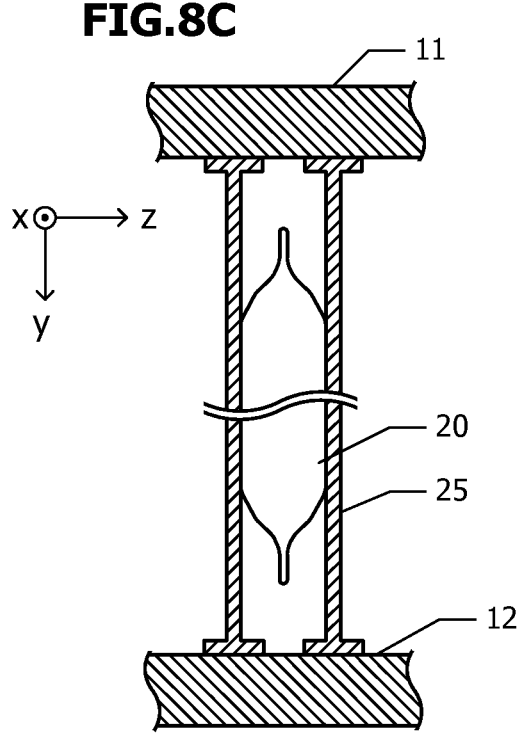

As shown in FIG. 8B, a bending portion may be provided with a certain degree of curvature. Alternatively, as shown in FIG. 8C, the sections of the end portions of the heat transfer plates 25 may have a T-shape.

Embodiment 10

Figure 9:
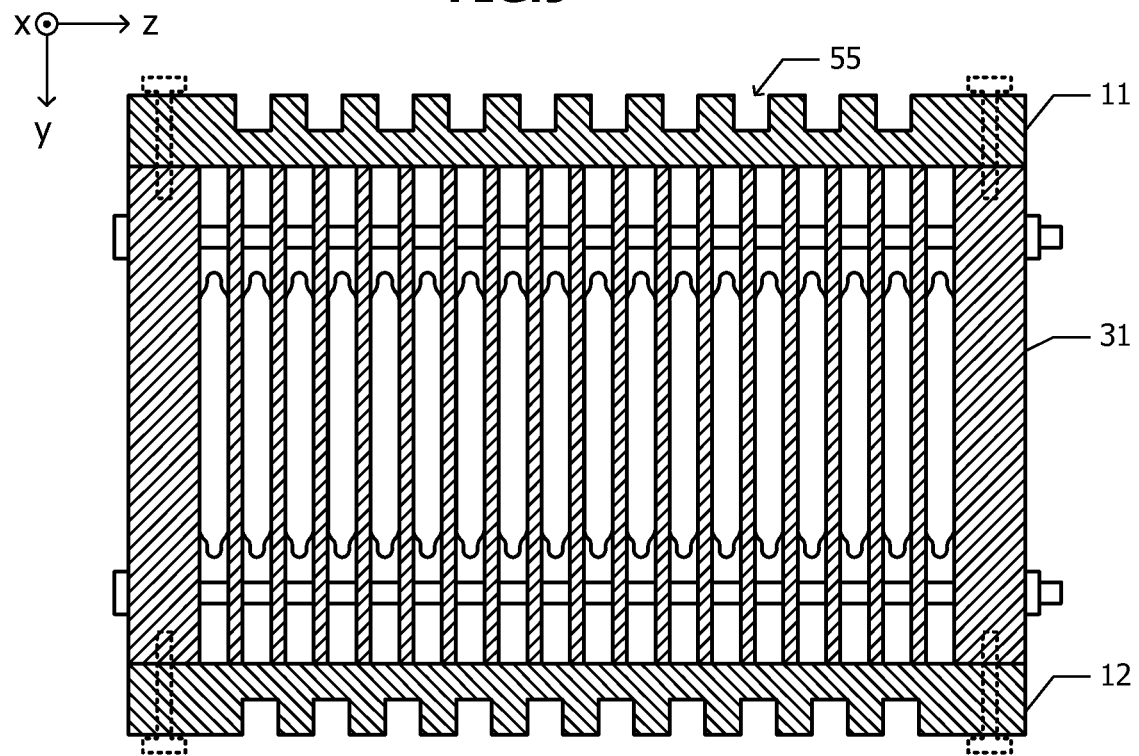
FIG. 9 is a cross-sectional view of a storage battery module according to Embodiment 10.

FIG. 9 shows a cross-sectional view of a storage battery module according to Embodiment 10. In Embodiment 10, instead of the refrigerant channel 17 of Embodiment 1 shown in FIG. 1B, irregularities 55 for enhancing heat radiation efficiency are formed on the outer surfaces of the wall plates 11 and 12. Recesses of irregularities 55 constitute a lattice pattern, for example. In other respects, the structure is the same as the structure of the storage battery module according to Embodiment 1. If heat-radiating irregularities 55 are attached instead of the refrigerant channel 17, the heat generated in the storage battery cells 20 can be radiated efficiently.

Although the example of the high-rigidity storage battery module based on the parallelepiped structure is shown in Embodiment 10, similarly to Embodiment 1, a structure may be adopted in which the wall plates 13 and 14 (FIGS. 1A and 1B) are removed under the condition that the rigidity or natural frequency required for an operating machine can be satisfied.

Embodiment 11

Figure 10:
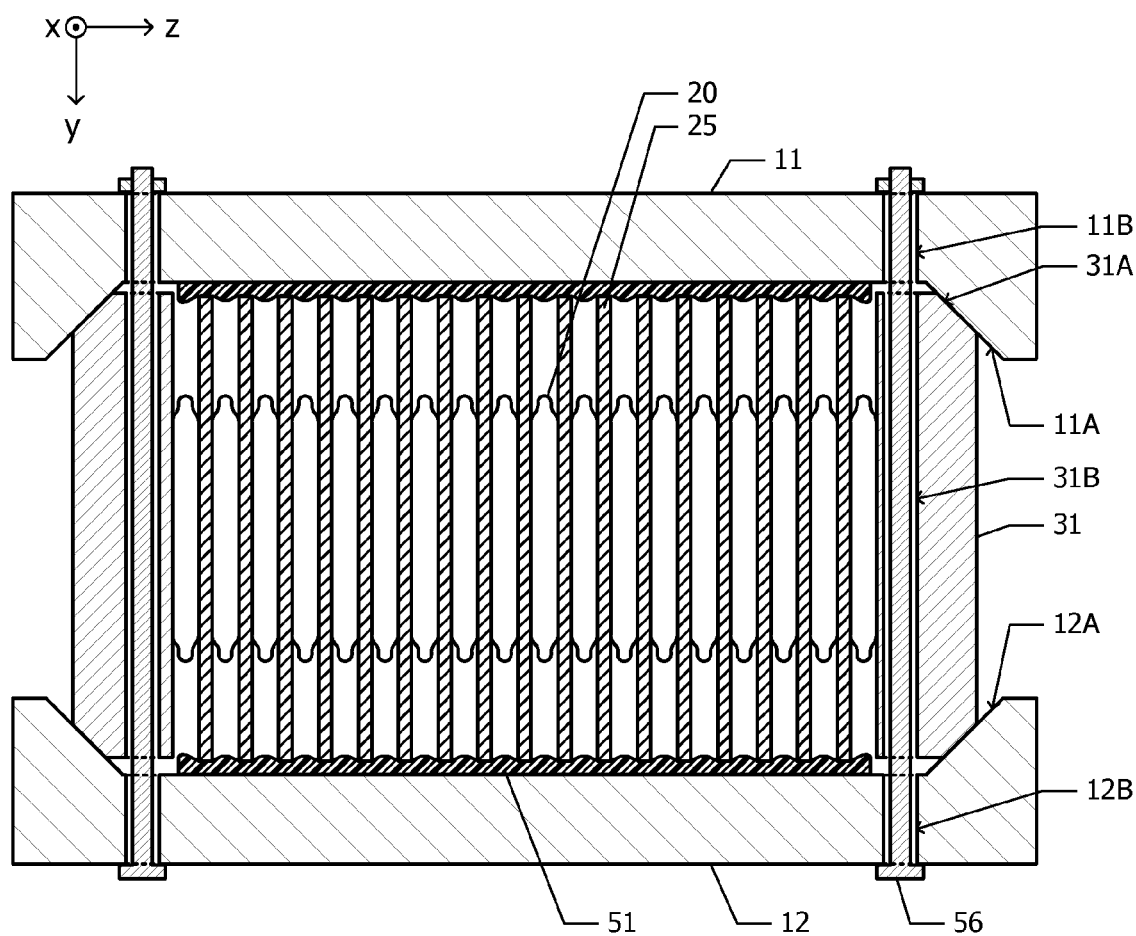
FIG. 10 is a cross-sectional view of a storage battery module according to Embodiment 11.

FIG. 10 shows a cross-sectional view of a storage battery module according to Embodiment 11. In the following description, attention will be paid to differences from Embodiment 8 shown in FIGS. 7A and 7B, and description about the same configuration will be omitted.

In Embodiment 8, the tie rods 33 (FIGS. 7A and 7B) are used in order to apply a compressive force to the stack structure of the storage battery cells 20 and the heat transfer plates 25. In Embodiment 11, the tie rods are not used, and a compressive force is applied by a wedge.

As shown in FIG. 10, in the pressing plates 31, the portions that connect end faces parallel to the x-axis and outer surfaces are chamfered to form inclined surfaces 11A. The wall plates 11 and 12 are formed with inclined surfaces 31A parallel to the inclined surfaces 11A. Bolts that constitute fastener components 56 reach the outer surface of the wall plate 11 through the inside of the wall plate 12, the pressing plates 31, and the other wall plate 11 in the y-axis direction from the outer surface of one wall plate 12. A compressive force in the y-axis direction is applied to the wall plates 11 and 12 by the fastener components 56.

By this compressive force, the heat transfer rubber sheets 51 are elastically deformed, and the heat transfer plates 25 are pressed against the wall plates 11 and 12 via the heat transfer rubber sheets 51. It is thereby possible to transfer heat efficiently to the wall plates 11 and 12 from the heat transfer plates 25.

Moreover, as the wall plates 11 and 12 approach each other, the inclined surface 11A and the inclined surface 31A come into contact with each other, and a force is applied to the pair of pressing plates 31 in a direction in which the pair of pressing plates 31 approaches each other. Thereby, a compressive force in the z-axis direction is applied to the stack structure of the storage battery cells 20 and the heat transfer plates 25.

In Embodiment 11, the fastener components 56 can apply a compressive force in the y-axis direction that presses the heat transfer plates 25 against the wall plates 11 and 12 and a compressive force in the z-axis direction to be applied to the stack structure. In order to apply a sufficient compressive force in the z-axis direction, it is preferable to set the dimension of the pressing plates 31 in the y-axis direction so that gaps are secured between the end faces of the pressing plates 31 perpendicular to the y-axis and the inner surfaces of the wall plates 11 and 12 in a state where the heat transfer rubber sheets 51 are elastically deformed.

Although the example of the high-rigidity storage battery module based on the parallelepiped structure is shown in Embodiment 11, similarly to Embodiment 1, a structure may be adopted in which the wall plates 13 and 14 (FIG. 7A) are removed under the condition that the rigidity or natural frequency required for an operating machine can be satisfied.

Embodiment 12

Figure 11A:
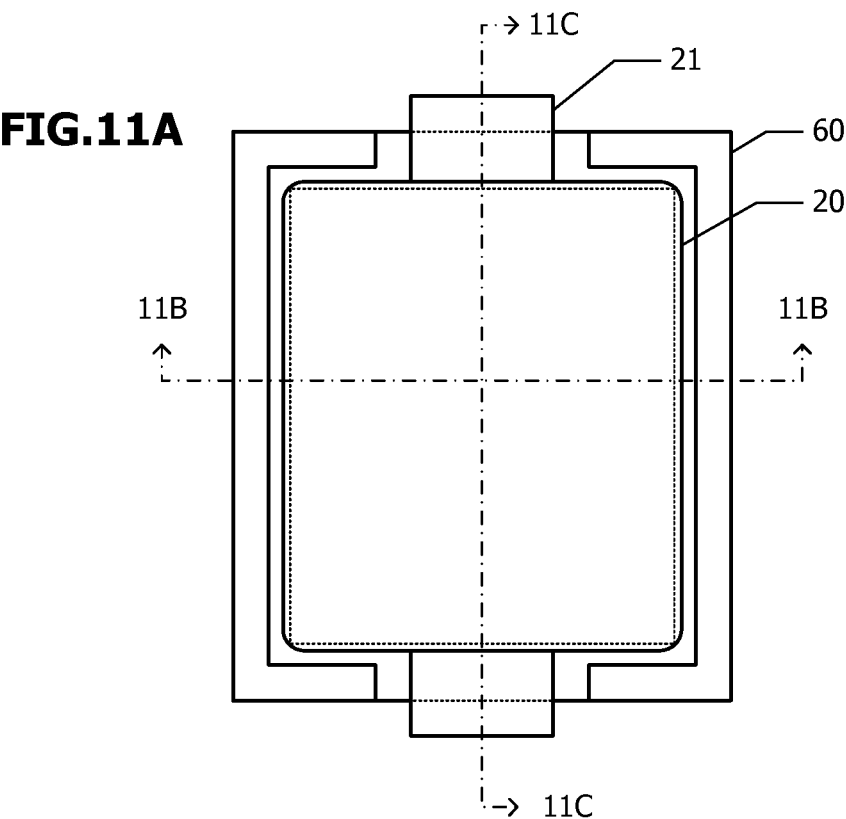
FIG. 11A is a plan view of a storage battery cell and a support frame used for a storage battery module according to Embodiment 12.

FIG. 11A shows a plan view of a storage battery cell and a support frame that are used for a storage battery module according to Embodiment 12. The configuration of the storage battery cell 20 and the electrodes 21 are the same as those of Embodiment 1. A pair of electrodes 21 are led out from mutually opposite edges of the storage battery cell 20. In plan view, a support frame 60 is arranged so as to surround the storage battery cell 20. Insulating resin, for example, is used for the support frame 60. The electrodes 21 extend to the outside of the outer peripheral edge of the support frame 60.

Figure 11B:
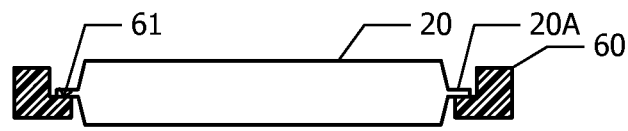
FIG. 11B is a cross-sectional view along a one-dot chain line 11B-11B of FIG. 11A.

FIG. 11B shows a cross-sectional view in a one-dot chain line 11B-11B of FIG. 11A. The storage battery cell 20 has a thin portion 20A in which front and back laminate films are welded on the outer peripheral portion of the cell. A side surface on the inner peripheral side of the support frame 60 has a two-stage stepped shape. The thin portion 20A is fixed to a tread surface 61 at the inner periphery of the support frame 60 by a two-sided adhesive tape or the like. The support frame 60 is thinner than the storage battery cell 20. For this reason, when the storage battery cells 20 are stacked in the thickness direction along with the support frame 60, the support frame 60 does not hinder application of a compressive force to the storage battery cells 20.

Figure 11C:
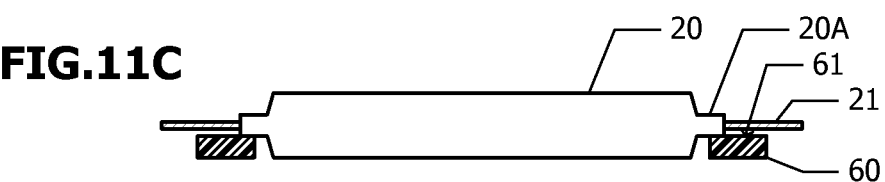
FIG. 11C is a cross-sectional view along a one-dot chain line 11C-11C of FIG. 11A.

FIG. 11C shows a cross-sectional view along a one-dot chain line 11C-11C of FIG. 11A. The electrodes 21 are led out to the outside from the edge of the thin portion 20A of the storage battery cell 20. As shown in FIG. 11A, in plan view, the tread surface 61 extends to the outer periphery of the support frame in the regions of the support frame 60 that overlap the electrodes 21. The electrodes 21 extend to the outside of the outer periphery of the support frame 60 via the region above the tread surface 61.

In Embodiment 12, when the storage battery cells 20 are stacked in the thickness direction, the side surface on the outer peripheral side of the support frame 60 serves as a reference plane of alignment regarding the in-plane direction perpendicular to the stacking direction. For this reason, alignment can be performed easily. Additionally, when each storage battery cell 20 is individually handled, the support frame 60 protects the storage battery cell 20. For this reason, damage to the storage battery cell 20 can be prevented or reduced.

Embodiment 13

In Embodiment 13, a shovel onto which at least one of the storage battery modules of Embodiments 1 to 12 is mounted is explained as an example.

Figure 12:
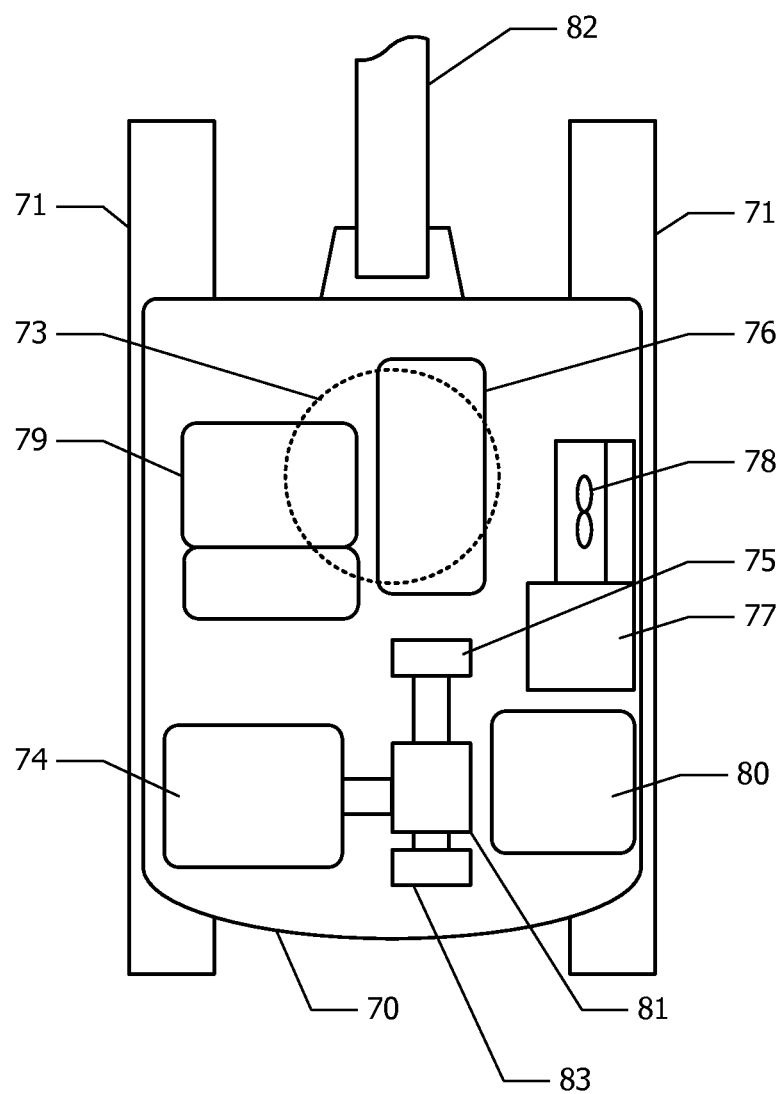
FIG. 12 is a schematic plan view of a hybrid shovel according to Embodiment 13.

FIG. 12 is a schematic plan view of a hybrid shovel as an operating machine according to Embodiment 13.

A lower traveling body (travelling equipment) 71 is attached to an upper rotation body 70 via a rotary bearing 73. An engine 74, a main pump 75, an electric motor 76, an oil tank 77, a cooling fan 78, a seat 79, a storage battery module 80, and a motor generator 83 are loaded onto the upper rotation body 70. The engine 74 generates motivity through combustion of fuel. The engine 74, the main pump 75, and the motor generator 83 transmit and receive torque mutually via a torque transmission mechanism 81. The main pump 75 supplies pressure oil to a hydraulic cylinder of a boom 82 or the like.

The motor generator 83 is driven by the motivity of the engine 74 to generate electricity (power-generation operation). The generated electric power is supplied to the storage battery module 80 so as to charge the storage battery module 80. Additionally, the motor generator 83 is driven by the electric power from the storage battery module 80 to generate the motivity for assisting the engine 74 (assist operation). The oil tank 77 stores oil for a hydraulic circuit. The cooling fan 78 suppresses a rise in the oil temperature of the hydraulic circuit. An operator sits down on the seat 79 to manipulate the hybrid shovel.

Figure 13:
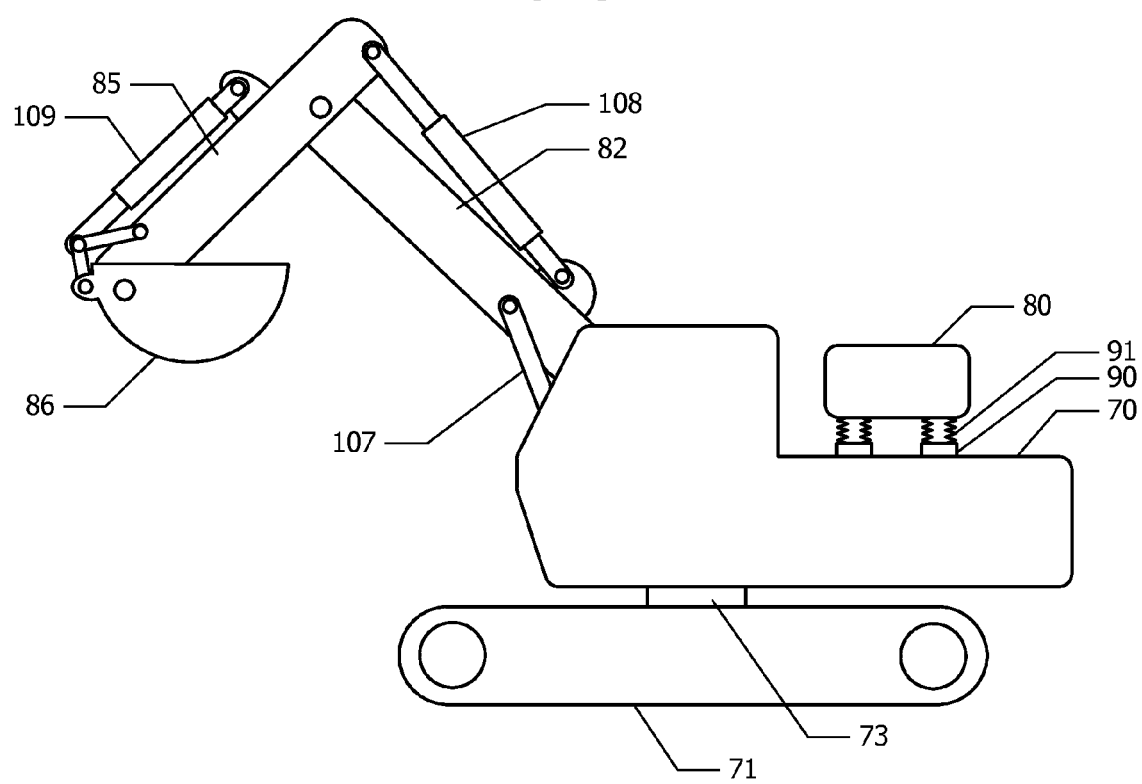
FIG. 13 is a schematic side view of a hybrid shovel according to Embodiment 13.

FIG. 13 shoes a side view of the hybrid shovel according to Embodiment 13. The upper rotation body 70 is loaded onto the lower traveling body 71 via the rotary bearing 73. The upper rotation body 70 rotates clockwise or counterclockwise with respect to the lower traveling body 71 by a driving force from the electric motor 76 (FIG. 12). The boom 82 is attached to the upper rotation body 70. The boom 82 is rocked in the vertical direction with respect to the upper rotation body 70 by a boom cylinder 107 that is driven hydraulically. An arm 85 is attached to the tip of the boom 82. The arm 85 is rocked in the front-and-rear direction with respect to the boom 82 by an arm cylinder 108 that is driven hydraulically. A bucket 86 is attached to the tip of the arm 85. The bucket 86 is rocked in the vertical direction with respect to the arm 85 by a bucket cylinder 109 that is driven hydraulically.

The storage battery module 80 is loaded onto the upper rotation body 70 via a mount 90 and a damper (anti-vibration device) 91 for a storage battery module. The storage battery modules according to the above Embodiments 1 to 12 are used as the storage battery module 80. The rotation motor 76 (FIG. 12) is driven by the electric power supplied from the storage battery module 80. Additionally, the rotation motor 76 converts kinetic energy into electrical energy to generate regenerative electric power. The storage battery module 80 is charged by the generated regenerative electric power.

Figure 14:
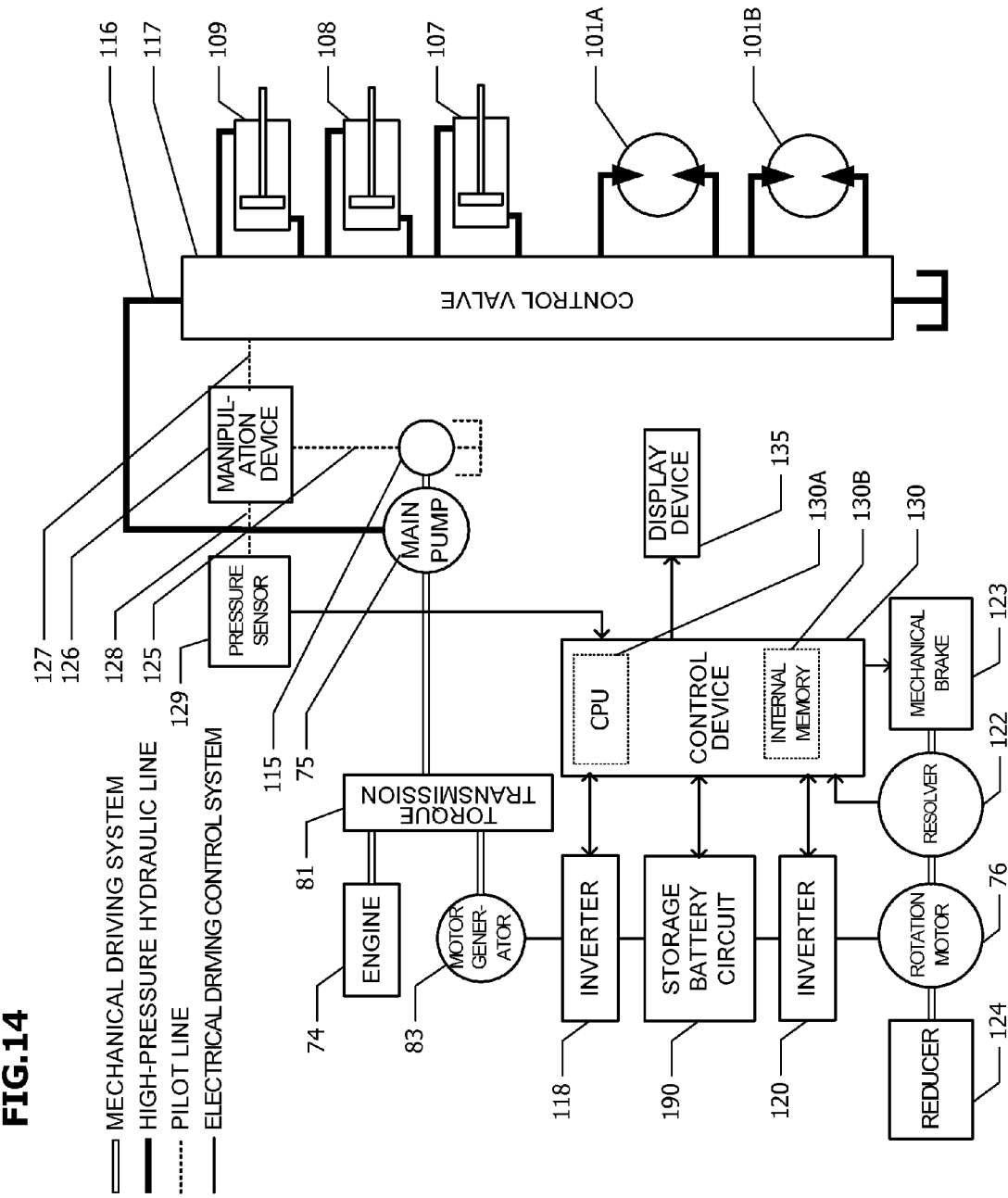
FIG. 14 is a block diagram of the hybrid shovel according to Embodiment 13.

FIG. 14 shoes a block diagram of the hybrid shovel according to Embodiment 13. In FIG. 14, a mechanical driving system is expressed by a double line, a high-pressure hydraulic line is expressed by a thick solid line, an electrical system is expressed by a thin solid line, and a pilot line is expressed by a broken line.

A driving shaft of the engine 74 is coupled to an input shaft of the torque transmission mechanism 81. Engines that generate a driving force with fuels other than electricity, for example, combustion engines, such as a diesel engine or the like, are used as the engine 74. The engine 74 is always driven during the operation of the operating machine.

A driving shaft of the motor generator 83 is coupled to another input shaft of the torque transmission mechanism 81. The motor generator 83 can perform both operations of the electric (assist) operation and the power-generation operation. For example, an interior permanent magnetic (IPM) motor in which magnets are embedded inside a rotor is used for the motor generator 83.

The torque transmission mechanism 81 has two input shafts and one output shaft. A driving shaft of the main pump 75 is coupled to this output shaft.

In a case where the load applied to the engine 74 is large, the motor generator 83 performs an assist operation and the driving force of the motor generator 83 is transmitted to the main pump 75 via the torque transmission mechanism 81. This reduces the load applied to the engine 74. On the other hand, when the load applied to an engine 74 is small, the motor generator 83 is operated to generate power as the driving force of the engine 74 is transmitted to the motor generator 83 via the torque transmission mechanism 81.

Switching of the motor generator 83 between the assist operation and the power-generation operation is performed by an inverter 118 connected to the motor generator 83. The inverter 118 is controlled by a control device 130.

The control device 130 includes a central processing unit (CPU) 130A and an internal memory 130B. The CPU 130A executes a driving control program stored in the internal memory 130B. The control device 130 displays the degradation states or the like of various devices on the display device 135, thereby calling a driver's attention.

The main pump 75 supplies oil pressure to a control valve 117 via the high-pressure hydraulic line 116. The control valve 117 distributes oil pressure to hydraulic motors 101A and 101B, the boom cylinder 107, the arm cylinder 108, and the bucket cylinder 109 according to commands from the driver. The hydraulic motors 101A and 101B drive two right and left crawlers, which are provided in the lower traveling body 71 shown in FIG. 13, respectively.

Input and output terminals of the electrical system of the motor generator 83 are connected to a storage battery circuit 190 via the inverter 118. The inverter 118 performs operation control of the motor generator 83 on the basis of a command from the control device 130. A rotation motor 76 is further connected to the storage battery circuit 190 via another inverter 120. The storage battery circuit 190 and the inverter 120 are controlled by the control device 130.

Required electric power is supplied to the motor generator 83 from the storage battery circuit 190 while the assist operation of the motor generator 83 is performed. The electric power that is generated by the motor generator 83 is supplied to the storage battery circuit 190 while the power-generation operation of the motor generator 83 is performed.

The rotation motor 76 is driven with an alternating current by a pulse-width-modulation (PWM) control signal from the inverter 120 to operate both a power operation and a regenerative operation. An IPM motor, for example, is used for the rotation motor 76. The IPM motor generates a large induced electromotive force during regeneration.

The rotation motor 76 rotates the upper rotation body 70 via a reducer 124 during the power operation of the rotation motor 76. In this case, the reducer 124 makes the rotating speed slow. This increases a rotative force generated by the rotation motor 76. Additionally, during the regenerative operation, the rotation operation of the upper rotation body 70 is transmitted to the rotation motor 76 via the reducer 124, whereby the rotation motor 76 generates regenerative electric power. In this case, the reducer 124 increases the rotating speed in contrast to during the power operation. Thereby, the rotational frequency of the rotation motor 76 can be raised.

A resolver 122 detects a position in the rotational direction of the rotating shaft of the rotation motor 76. The detection result is input to the control device 130. By detecting a position in the rotational direction of the rotating shaft of the rotation motor 76 before operation and after operation, a rotation angle and a rotation direction are derived.

A mechanical brake 123 is coupled to the rotating shaft of the rotation motor 76 so as to generate a mechanical braking force. The braking state and release state of the mechanical brake 123 are under the control of the control device 130, and are switched by an electromagnetic switch.

The pilot pump 115 generates pilot pressure required for a hydraulic manipulation system. The generated pilot pressure is supplied to a manipulation device 126 via a pilot line 125. The manipulation device 126 includes a lever or a pedal, and is manipulated by a driver. The manipulation device 126 converts primary oil pressure supplied from the pilot line 125 according to the manipulation of the driver into secondary oil pressure. The secondary oil pressure is transmitted to the control valve 117 via a hydraulic line 127, and is transmitted to a pressure sensor 129 via another hydraulic line 128.

The pressure detection result detected by the pressure sensor 129 is input to the control device 130. Thereby, the control device 130 can detect the manipulation situations of the lower traveling body 71, the rotation motor 76, the boom 82, the arm 85, and the bucket 86. Particularly, in the hybrid shovel according to Embodiment 13, the rotation motor 76 drives the rotary bearing 73. For this reason, it is desired to detect the manipulation amount of a lever for controlling the rotation motor 76 with high precision. The control device 130 can detect the manipulation amount of the lever via the pressure sensor 129 with high precision.

Moreover, the control device 130 can detect a state (non-operational state) where the lower traveling body 71, the rotation motor 76, the boom 82, the arm 85, and the bucket 86 are all not operated, and neither supply of electric power to the storage battery circuit 190 nor compulsory extraction of electric power from the storage battery circuit 190 is performed.

Figure 15:
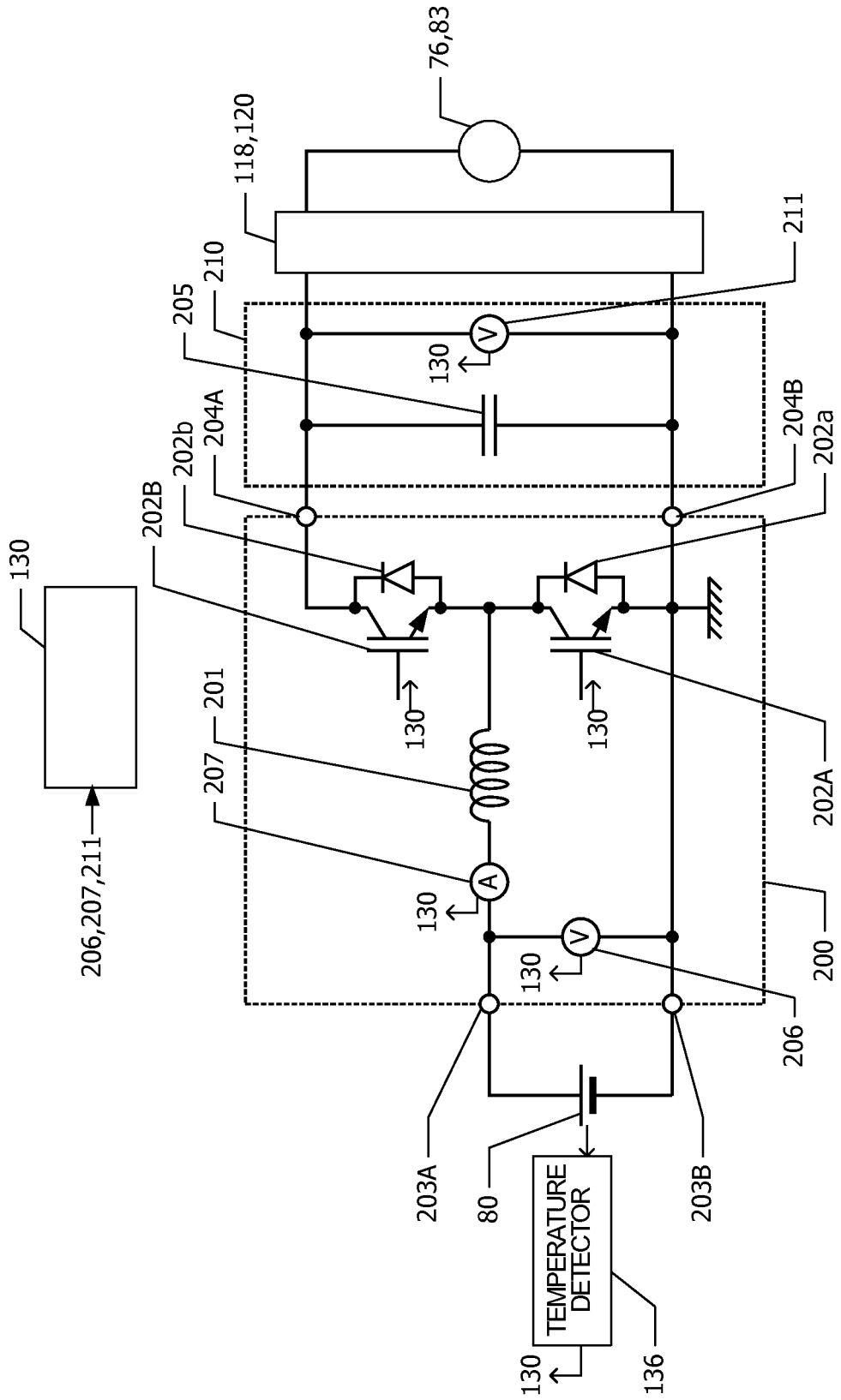
FIG. 15 is an equivalent circuit diagram of a storage battery circuit of the hybrid shovel according to Embodiment 13.

FIG. 15 shows an equivalent circuit diagram of the storage battery circuit 190. A storage battery circuit 190 includes a storage battery module 80, a converter 200, and a DC bus line 210. The storage battery module 80 is connected to a pair of power source connecting terminals 203A and 203B of the converter 200, and the DC bus line 210 is connected to a pair of output terminals 204A and 204B. One power source connecting terminal 203B and one output terminal 204B are grounded. The storage battery modules according to the above Embodiments 1 to 12 are used as the storage battery module 80.

The DC bus line 210 is connected to the motor generator 83 and the rotation motor 76 via inverters 118 and 120. A voltage generated in the DC bus line 210 is measured by a voltmeter 211, and the measurement result is input to the control device 130.

A series circuit where a collector of a step-up insulated gate bipolar transistor (IGBT) 202A and an emitter of step-down IGBT 202B are mutually connected is connected between the output terminals 204A and 204B. An emitter of the step-up IGBT 202A is grounded, and a collector of the step-down IGBT 202B is connected to the output terminal 204A on the high-voltage side. A mutual connection point between the step-up IGBT 202A and the step-down IGBT 202B is connected to the power source connecting terminal 203A on the high-voltage side via a reactor 201.

Diodes 202a and 202b are connected in parallel to the step-up IGBT 202A and the step-down IGBT 202B, respectively, in a direction in which a direction from the emitter to the collector corresponds to a forward direction. A smoothing capacitor 205 is inserted between the output terminals 204A and 204B.

The voltmeter 206 connected between the power source connecting terminals 203A and 203B measures the voltage between terminals of the storage battery module 80. An ammeter 207 inserted in series with the reactor 201 measures the charge/discharge current of the storage battery module 80. The voltage and current measurement results are input to the control device 130.

A temperature detector 136 detects the temperature of the storage battery module 80. The detected temperature data is input to the control device 130. The temperature detector 136 includes, for example, four thermometers prepared corresponding to four storage battery cells selected from the plurality of storage battery cells that constitute the storage battery module 80. The control device 130, for example, calculates the average of four temperature data acquired by the four thermometers, and adopts the average value as the temperature of the storage battery module 80. Alternatively, when the overheating state of the capacitor is to be detected, the highest temperature among temperatures indicated by the four temperature data may be adopted as the temperature of the storage battery module. On the contrary, the lowest temperature among the temperatures indicated by the four temperature data may be adopted as the temperature of the storage battery module, in the detection of a state where the temperature of the storage battery module falls excessively.

The control device 130 applies pulse-width-modulation (PWM) voltages for control to gate electrodes of the step-up IGBT 202A and the step-down IGBT 202B.

The step-up operation (discharge operation) will be described below. A PWM voltage is applied to the gate electrode of the step-up IGBT 202A. When the step-up IGBT 202A becomes turned off, an induced electromotive force in a direction in which a current is made to flow from the power source connecting terminal 203A on the high-voltage side toward the collector of the step-up IGBT 202A is generated in the reactor 201. This electromotive force is applied to the DC bus line 210 via the diode 202b. Thereby, the DC bus line 210 is stepped up.

Next, the step-down operation (charge operation) will be described. A PWM voltage is applied to the gate electrode of the step-down IGBT 202B. When the step-down IGBT 202B becomes turned off, an induced electromotive force in a direction in which a current is made to flow from the emitter of the step-down IGBT 202B toward the power source connecting terminal 203A on the high-voltage side is generated in the reactor 201. The storage battery module 80 is charged by this induced electromotive force.

Since the storage battery modules according to the above Embodiments 1 to 12 are used as the storage battery module 80, damage to the storage battery module 80 caused by vibration or a shock is suppressed. Particularly when the upper rotation body 70 shakes up and down due to rattling of the rotary bearing 73 (FIG. 12, FIG. 13) and damage to the storage battery module 80 caused by vibration that cannot be absorbed by the a damper 91 (FIG. 13) can be suppressed. Moreover, efficient heat radiation from storage battery cells can be realized.

Embodiment 14

In Embodiment 14, a shovel onto which at least one of the storage battery modules of Embodiments 1 to 12 is mounted is loaded is illustrated.

Figure 16:
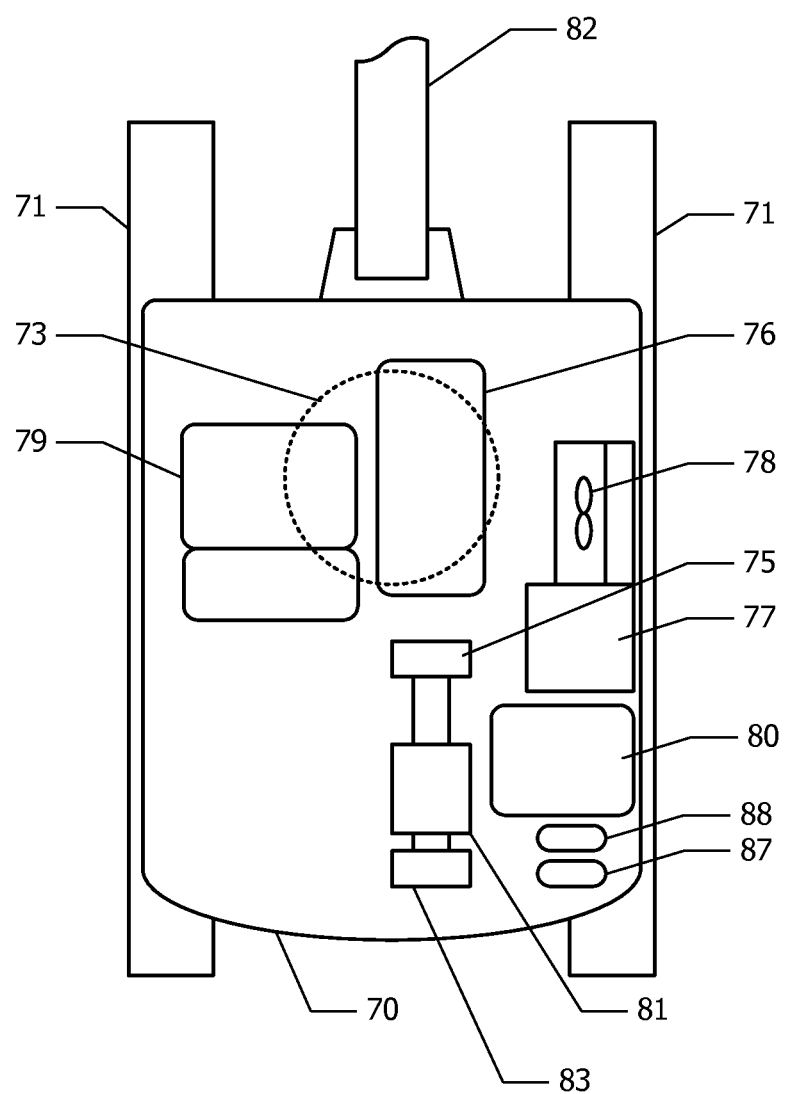
FIG. 16 is a schematic plan view of an electric shovel according to Embodiment 14.
Figure 17:
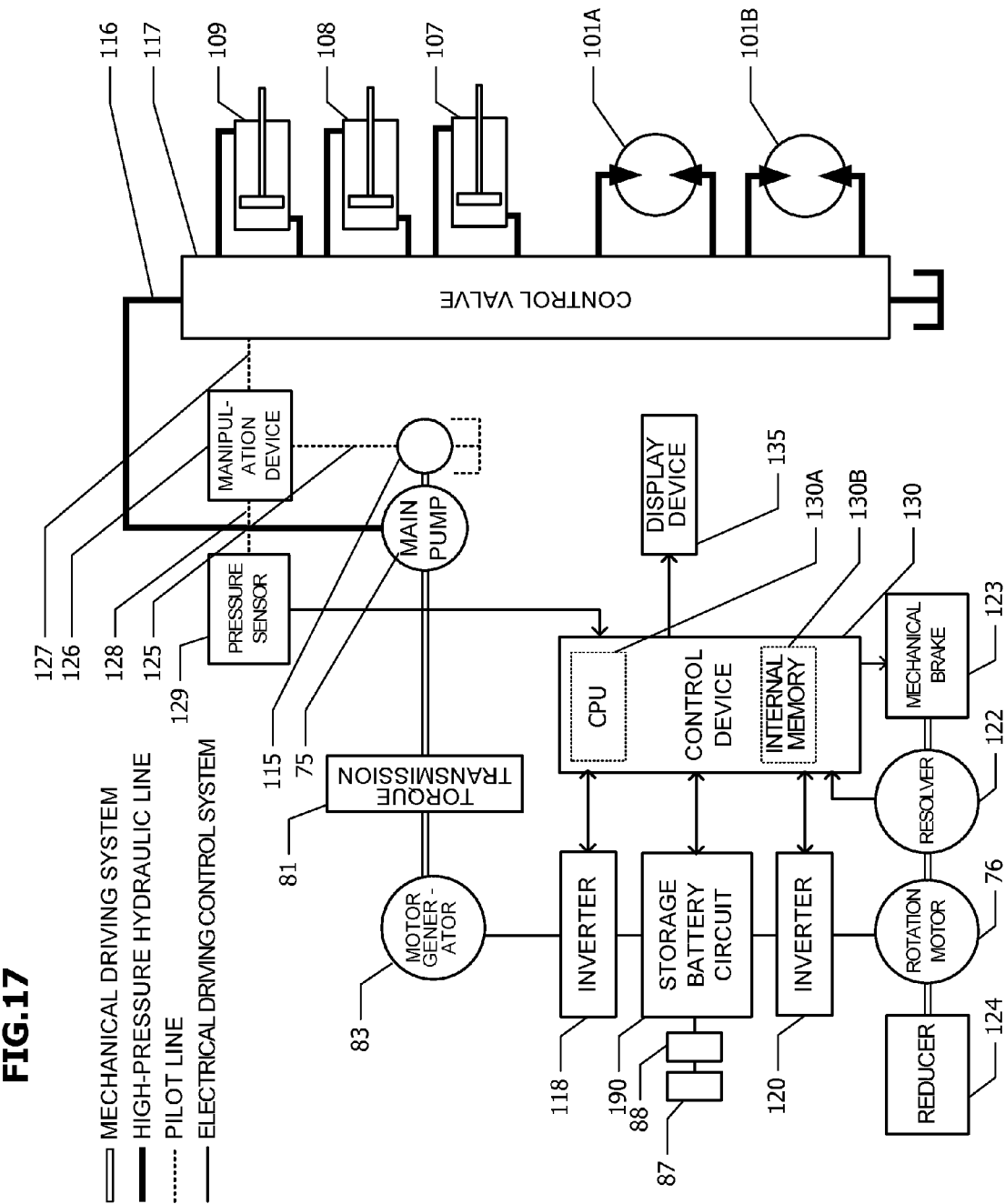
FIG. 17 is a block diagram of the electric shovel according to Embodiment 14.

FIGS. 16 and 17 are respectively a schematic plan view and a block diagram of an electric shovel as the operating machine according to Embodiment 14. In the following description, attention will be paid to differences from Embodiment 13 shown in FIGS. 12 and 14, and description of the same configuration will be omitted.

In the electric shovel according to Embodiment 14, the engine 74 (FIGS. 12 and 14) is not loaded. A voltage converter 88 and an external power source connecting plug 87 for charging the storage battery module 80 are prepared. The storage battery module 80 can be charged via the external power source connecting plug 87 and the voltage converter 88 from an external power source. The motor generator 83 does not operate as a generator, and operates only as an electric motor by the electric power supplied from the storage battery module 80 (storage battery circuit 190).

The voltage converter 88 performs voltage conversion for adapting the voltage of the external power source to the voltage of the storage battery module 80.

The storage battery modules according to Embodiments 1-12 can be applied not only to a hybrid shovel but also to an electric shovel.

Although the invention has been described above in accordance with the embodiments, the invention is not limited to these. For example, it will be obvious to those skilled in the art that various alterations, improvements, combinations, or the like can be made.

The following additional remarks are disclosed on the basis of the above Embodiments.

(Additional Remark 1)

A storage battery module for an operating machine comprising:

a plurality of stacked bodies being arranged in x-direction, each having a plurality of plate-shaped storage battery cells that are stacked in z-direction when an xyz rectangular coordinate system is defined, pressing plates arranged at both ends of a stack structure of the storage battery cells, first tie rods that couple the pair of pressing plates together and apply a compressive force in the z-direction to the stack structure of the storage battery cells, and at least one heat transfer plate pinched between the storage battery cells;

a first wall plate and a second wall plate that pinch the plurality of stacked bodies in the y-direction, and are fixed to the pressing plates of the stacked bodies; and a third wall plate and a fourth wall plate that pinch the plurality of stacked bodies in the x-direction, and are fixed to the first wall plate and the second wall plate, wherein the pressing plates of the stacked body arranged at one end in the x-direction are fixed to the third wall plate, the pressing plates of the stacked body arranged at the other end in the x-direction are fixed to the fourth wall plate, and wherein the heat transfer plates are thermally combined with the first wall plate and the second wall plate.

(Additional Remark 2)

The storage battery module for an operating machine according to Additional Remark 1, further comprising:

a partition wall between the stacked bodies that are adjacent to each other in the x-direction, wherein the partition wall is fixed to the first wall plate, the second wall plate, and the pressing plates of the stacked bodies on both sides of the partition wall.

(Additional Remark 3)

A shovel comprising:

the storage battery module for an operating machine according to Additional Remark 1 or 2; and a motor that is driven with electric power supplied from the storage battery module, converts kinetic energy into electrical energy to generate regenerative electric power, and charges the storage battery module.

(Additional Remark 4)

The shovel according to Additional Remark 3, further comprising:

a lower traveling body; and an upper rotation body rotatably attached to the lower traveling body, wherein the motor rotates the upper rotation body.

DESCRIPTION OF REFERENCE NUMERALS AND SIGNS 11, 12, 13, 14: WALL PLATE
15: PARTITION WALL
17: REFRIGERANT CHANNEL
20: STORAGE BATTERY CELL
20A: THIN PORTION
21: ELECTRODE
25: HEAT TRANSFER PLATE
27: BLEED VALVE
30: STACKED BODY
31: PRESSING PLATE
33: TIE ROD (FIRST TIE ROD)
40: TIE ROD (SECOND TIE ROD)
43: INTERMEDIATE PLATE
45: THERMALLY-CONDUCTIVE ADHESIVE
46: GROOVE
50: GROOVE
51: HEAT-TRANSFER RUBBER SHEET
55: IRREGULARITIES
56: FASTENER COMPONENT
60: SUPPORT FRAME
61: TREAD SURFACE
70: UPPER ROTATION BODY
71: LOWER TRAVELING BODY (BASE)
73: ROTARY BEARING
74: ENGINE
75: MAIN PUMP
76: ROTATION MOTOR
77: OIL TANK
78: COOLING FAN
79: SEAT
80: STORAGE BATTERY MODULE
81: TORQUE TRANSMISSION MECHANISM
82: BOOM
83: MOTOR GENERATOR
85: ARM
86: BUCKET
87: EXTERNAL POWER SOURCE CONNECTING PLUG
88: VOLTAGE CONVERTER
90: STORAGE BATTERY MODULE MOUNT
91: DAMPER (ANTI-VIBRATION DEVICE)
101A, 101B: HYDRAULIC MOTOR
107: BOOM CYLINDER
108: ARM CYLINDER
109: BUCKET CYLINDER
114: MAIN PUMP
115: PILOT PUMP
116: HIGH-PRESSURE HYDRAULIC LINE
117: CONTROL VALVE
118: INVERTER
119: CAPACITOR
120: INVERTER
122: RESOLVER
123: MECHANICAL BRAKE
124: REDUCER
125: PILOT LINE
126: MANIPULATION DEVICE
127, 128: HYDRAULIC LINE
129: PRESSURE SENSOR
130: CONTROL DEVICE
135: DISPLAY DEVICE
136: TEMPERATURE DETECTOR
200: CONVERTER
201: REACTOR
202A: STEP-UP IGBT
202B: STEP-DOWN IGBT
202A, 202B: DIODE
203A, 203B: POWER SOURCE CONNECTING TERMINAL
204A, 204B: OUTPUT TERMINAL

205: SMOOTHING CAPACITOR
206: VOLTMETER
207: AMMETER
211: VOLTMETER

The invention claimed is:

1. A shovel comprising:
a lower traveling body;
an upper rotation body rotatably attached to the lower traveling body; and
a storage battery module loaded onto the upper rotation body,
wherein the storage battery module comprises:
a stacked body having
a plurality of plate-shaped storage battery cells that are stacked in z-direction when an xyz rectangular coordinate system is defined,
at least one heat transfer plate arranged between the storage battery cells, and
pressing plates, which are arranged at both ends of a stack structure of the storage battery cells, and apply a compressive force in a stacking direction to the storage battery cells;
a first wall plate and a second wall plate that pinch the stacked body in the y-direction; and
a fastener component which applies a compressive force to the first wall plate and the second wall plate in a direction such that a distance between the first wall plate and the second wall plate is narrowed upon tightening the fastener component, and the fastener component is adapted to thermally couple the heat transfer plate to the first wall plate and the second wall plate, and
wherein the positions of the heat transfer plates are restricted with respect to the first wall plate and the second wall plate.

2. The shovel according to claim 1,
wherein the heat transfer plates are thermally combined with the first wall plate and the second wall plate.

3. The shovel according to claim 1, further comprising:
a refrigerant channel or irregularities for heat radiation for cooling the first wall plate and the second wall plate.

4. The shovel according to claim 1,
wherein the heat transfer plates are anchored to the first wall plate and the second wall plate.

5. The shovel according to claim 1,
wherein an adhesive having thermal conductivity is arranged between the heat transfer plates and the first wall plate and between the heat transfer plates and the second wall plate.

6. The shovel according to claim 1, wherein the stacked body further comprises first tie rods that couple the pair of pressing plates together and apply a compressive force in the stacking direction to the stack structure of the storage battery cells, and
the shovel further comprises a third wall plate and a fourth wall plate that pinch the stacked body in the x-direction and are fixed to the pair of pressing plates, the first wall plate, and the second wall plate.

7. The shovel according to claim 1,
wherein the stacked body further comprises an intermediate plate arranged between the storage battery cells, and
wherein the intermediate plate is fixed to the first wall plate and the second wall plate at the outer periphery of the intermediate plate.

8. A shovel comprising:
a lower traveling body;
an upper rotation body rotatably attached to the lower traveling body; and
a storage battery module loaded onto the upper rotation body,
wherein the storage battery module comprises:
a stacked body having
a plurality of plate-shaped storage battery cells that are stacked in z-direction when an xyz rectangular coordinate system is defined,
at least one heat transfer plate arranged between the storage battery cells,
pressing plates, which are arranged at both ends of a stack structure of the storage battery cells, and apply a compressive force in a stacking direction to the storage battery cells;
a first wall plate and a second wall plate that pinch the stacked body in the y-direction and are fixed to the pressing plates,
recesses formed in inner surfaces of the first wall plate and the second wall plate; and
elastic members having thermal conductivity arranged within the recesses and partially protruding from opening planes of the recesses in a state where an external force is not applied to the elastic members;
wherein the positions of the heat transfer plates are restricted with respect to the first wall plate and the second wall plate, and
wherein the edges of the heat transfer plates are arranged so as to intersect the recesses, come into contact with inner surfaces of the first and second wall plates, and crush the elastic members.

9. A shovel comprising:
a lower traveling body;
an upper rotation body rotatably attached to the lower traveling body; and
a storage battery module loaded onto the upper rotation body,
wherein the storage battery module comprises:
a plurality of stacked bodies being arranged in the y-direction, each having
a plurality of plate-shaped storage battery cells that are stacked in z-direction when an xyz rectangular coordinate system is defined,
pressing plates arranged at both ends of a stack structure of the storage battery cells,
first tie rods that couple the pair of pressing plates together and apply a compressive force in a stacking direction to the stack structure of the storage battery cells, and
at least one heat transfer plate pinched between the storage battery cells;
a first wall plate and a second wall plate that are attached to each of the stacked bodies, pinch each of the stacked bodies in the y-direction, are fixed to the pressing plates, and are thermally combined with the heat transfer plates;
a third wall plate and a fourth wall plate that pinch the plurality of stacked bodies in the x-direction, and are fixed to the pressing plates of the plurality of stacked bodies, and the first wall plate and the second wall plate attached to the plurality of stacked bodies; and
a fastener component adapted to apply a compressive force to the first wall plate and the second wall plate in a direction in which a distance between the first wall plate and the second wall plate is narrowed and adapted to thermally couple the heat transfer plate to the first wall plate and the second wall plate.

10. The shovel according to claim 9, further comprising:
a motor that is driven with electric power supplied from the storage battery module, converts kinetic energy into electrical energy to generate regenerative electric power, and charges the storage battery module.

11. The shovel according to claim 10,
wherein the motor rotates the upper rotation body.

* * * * *